US008463036B1

United States Patent
Ramesh et al.

(10) Patent No.: US 8,463,036 B1
(45) Date of Patent: Jun. 11, 2013

(54) SHAPE-BASED SEARCH OF A COLLECTION OF CONTENT

(75) Inventors: Sunil Ramesh, San Jose, CA (US); Arnab Dhua, Sunnyvale, CA (US); Gurumurthy D. Ramkumar, Palo Alto, CA (US); Gautam Bhargava, Palo Alto, CA (US); Sonja E. Hyde-Moyer, Redwood City, CA (US)

(73) Assignee: A9.com, Inc., Palo Alto, CA (US)

( * ) Notice: Subject to any disclaimer, the term of this patent is extended or adjusted under 35 U.S.C. 154(b) by 297 days.

(21) Appl. No.: 12/895,617

(22) Filed: Sep. 30, 2010

(51) Int. Cl.
G06K 9/00 (2006.01)
G06K 9/46 (2006.01)

(52) U.S. Cl.
USPC .......................................... 382/170; 382/203

(58) Field of Classification Search
None
See application file for complete search history.

(56) References Cited

U.S. PATENT DOCUMENTS

| | | | | |
|---|---|---|---|---|
| 5,848,409 A | * | 12/1998 | Ahn | 1/1 |
| 5,852,823 A | * | 12/1998 | De Bonet | 382/279 |
| 6,366,910 B1 | | 4/2002 | Rajaraman et al. | 1/1 |
| 6,415,282 B1 | * | 7/2002 | Mukherjea et al. | 707/737 |
| 6,489,968 B1 | * | 12/2002 | Ortega et al. | 715/713 |
| 6,606,619 B2 | | 8/2003 | Ortega et al. | 1/1 |
| 6,621,926 B1 | * | 9/2003 | Yoon et al. | 382/168 |
| 6,731,826 B1 | * | 5/2004 | Yamamoto et al. | 382/305 |
| 6,754,675 B2 | * | 6/2004 | Abdel-Mottaleb et al. | 1/1 |
| 6,774,917 B1 | * | 8/2004 | Foote et al. | 715/700 |
| 7,110,591 B2 | * | 9/2006 | Neubauer et al. | 382/147 |
| 7,346,559 B2 | * | 3/2008 | Kraft et al. | 705/26.62 |
| 7,532,214 B2 | * | 5/2009 | Lundstrom | 345/424 |
| 7,555,447 B2 | * | 6/2009 | Chinnappan et al. | 705/26.8 |
| 7,636,496 B2 | * | 12/2009 | Duan et al. | 382/274 |
| 7,639,893 B2 | * | 12/2009 | Duan et al. | 382/274 |
| 7,660,461 B2 | * | 2/2010 | Lundstrom et al. | 382/168 |
| 7,797,271 B1 | * | 9/2010 | Bonneau et al. | 705/343 |
| 8,073,287 B1 | * | 12/2011 | Wechsler et al. | 382/278 |
| 8,144,947 B2 | | 3/2012 | Kletter | 382/124 |
| 8,180,690 B2 | * | 5/2012 | Mayle et al. | 705/27.1 |
| 2002/0138374 A1 | * | 9/2002 | Jennings et al. | 705/29 |
| 2002/0168097 A1 | * | 11/2002 | Neubauer et al. | 382/145 |
| 2004/0165767 A1 | * | 8/2004 | Gokturk et al. | 382/159 |
| 2007/0008317 A1 | * | 1/2007 | Lundstrom | 345/424 |
| 2007/0185839 A1 | * | 8/2007 | Shah et al. | 707/3 |
| 2007/0214172 A1 | * | 9/2007 | Nister et al. | 707/102 |
| 2007/0217676 A1 | * | 9/2007 | Grauman et al. | 382/170 |
| 2007/0219933 A1 | * | 9/2007 | Datig | 706/4 |
| 2007/0248265 A1 | * | 10/2007 | Lundstrom et al. | 382/168 |
| 2007/0268534 A1 | * | 11/2007 | Duan et al. | 358/520 |
| 2007/0269132 A1 | * | 11/2007 | Duan et al. | 382/274 |
| 2008/0152218 A1 | * | 6/2008 | Okada | 382/159 |
| 2008/0177640 A1 | * | 7/2008 | Gokturk et al. | 705/27 |
| 2009/0154795 A1 | * | 6/2009 | Tan et al. | 382/155 |
| 2009/0279778 A1 | * | 11/2009 | Ekin | 382/170 |

* cited by examiner

*Primary Examiner* — Wenpeng Chen
*Assistant Examiner* — Feng Niu
(74) *Attorney, Agent, or Firm* — Novak Druce Connolly Bove + Quigg LLP

(57) ABSTRACT

Shape-based search of a collection of content associated with one or more images of inventory items ("inventory images") is enabled at least in part by associating the collection of content and/or its associated inventory images with representative refinement shapes. Inventory items may be grouped into categories and at least one refinement shape may be created for each of the categories. A refinement-shape hierarchy may be created by arranging the refinement shapes into parent and child refinement shapes. Inventory images may be associated to at least one of the refinement shapes of the refinement-shape hierarchy based at least in part on similarities between the refinement shapes and shapes of the inventory items reflected in the inventory images.

24 Claims, 29 Drawing Sheets

SHAPE-BASED SEARCH OF A COLLECTION OF CONTENT

CROSS-REFERENCE TO RELATED APPLICATIONS

This application is related to U.S. patent application Ser. No. 12/895,527 titled "PROCESSING AND COMPARING IMAGES", filed herewith, U.S. patent application Ser. No. 12/895,506 titled "CONTOUR DETECTION AND IMAGE CLASSIFICATION", filed herewith, and U.S. patent application Ser. No. 12/895,601 titled "CONTENT SEARCH WITH CATEGORY-AWARE VISUAL SIMILARITY", filed herewith, each of which is hereby incorporated by reference in its entirety.

BACKGROUND

Individuals often search across large collections of electronic records for items of interest. Such electronic records may include digitized photographs of various items. For example, an individual may keyword search across a large collection of digitized photographs to identify a subset of photographs related to items of interest. However, the subsets of photographs resulting from the keyword search may include thousands of photographs of different items having varying shapes. Such shapes may be indicative the style or type of the items. To refine the search results, some conventional solutions require that the individual manually describe the items of interest in further detail using additional keywords. Such manual descriptions of items may be labor intensive and error prone. In addition, the keywords chosen by one individual to describe an item are not necessarily the keywords that will be chosen by another person searching for the same item. For example, "women's high-heeled pump" and "women's dress shoe" might be used by different people to describe the same type of shoe. Accordingly, it may be desirable to refine the search results by selecting shapes—instead of inputting additional keywords—associated with the style and type of the items of interest.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of number is for purposes of simplicity of explanation and understanding, and should not be viewed as a limitation on the various embodiments.

DETAILED DESCRIPTION

Figure 1:
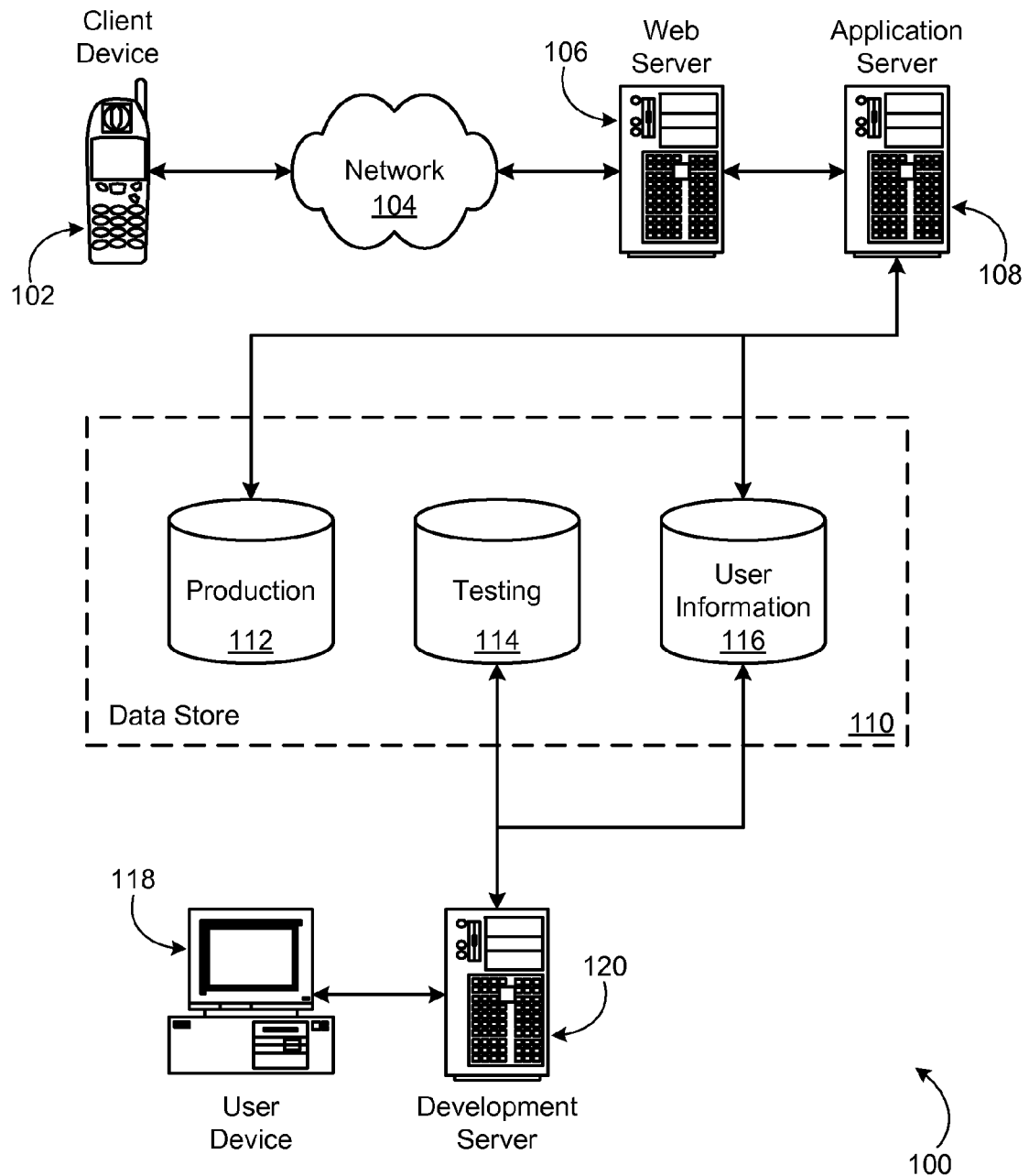
FIG. 1 is a schematic diagram illustrating an example environment for implementing aspects in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details, and that variations and other aspects not explicitly disclosed herein are contemplated within the scope of the various embodiments. Furthermore, well-known features may be omitted or simplified in order not to obscure the embodiment being described.

In at least one embodiment, shape-based search of a collection of content associated with one or more images of inventory items ("inventory images") may be enabled at least in part by associating the collection of content and/or its associated inventory images with representative refinement shapes. According to at least one embodiment, inventory items are grouped into categories and at least one refinement shape is created for each of the categories. A refinement-shape hierarchy may be created by arranging the refinement shapes into parent and child refinement shapes.

A set of training images of training items is received and individual training images of the set of training images are assigned to representative refinement shapes based at least in part on similarities between the refinement shapes and shapes of the training items reflected in the training images. Training images may be analyzed to calculate representative histogram descriptors. In such cases, the histogram descriptors of the training images assigned to a particular refinement shape define, at least in part, the descriptor space for that refinement shape.

Inventory images may also be analyzed to calculate representative histogram descriptors. Inventory images may assigned to the refinement shapes of the refinement-shape hierarchy based at least in part on similarities between the histogram descriptors of the inventory images and the histogram descriptors of the training images that define the descriptor space of the refinement shapes. According to some embodiments, local-shape, global-shape, texture, and contour histogram descriptors may be calculated for each of the inventory images and training images. Local-shape histogram descriptors describe the local shape of the item reflected in the image, global-shape histogram descriptors describe the overall shape of the item reflected in the image, texture histogram descriptors describe patterns that exist in the texture of the item reflected in the image, and contour histogram descriptors describe the contour of the item reflected in the image. For each image, any two or more of the local-shape, global-shape, texture, and contour histogram descriptors of the image may be combined into a combined histogram descriptor.

Responsive to receiving information for a search request specifying at least one of the refinement shapes, search results are provided that include at least a reference to the inventory images that are assigned to the specified refinement shape. Embodiments of example systems and methods for providing shape-based search of inventory images are discussed below with referent to FIGS. 1-2 and 22-29, for example.

Various approaches may be implemented in various environments for various applications. For example, FIG. 1 illustrates an example of an environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers (PCs), cell phones, mobile phones, smart phones, third generation (3G) phones, touch-screen phones, handheld messaging devices, netbooks, computers incorporating touch-screens, tablet PCs, laptop computers, set-top boxes, personal data assistants (PDAs), electronic book readers, and the like. The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment. The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example. The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
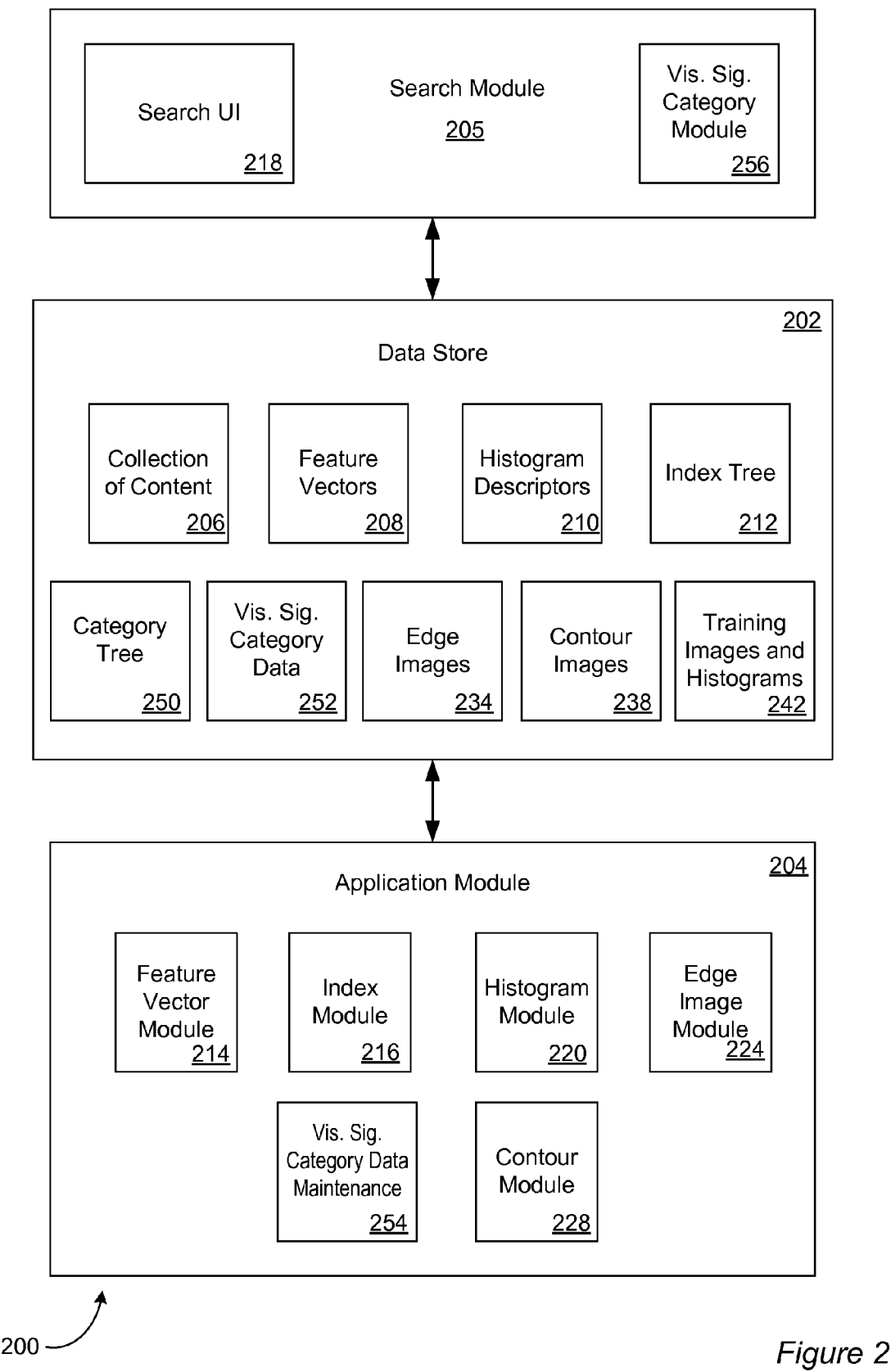
FIG. 2 is a schematic diagram depicting aspects of an example computerized system in accordance with at least one embodiment.

It will be helpful to have reference to an example system configured to create histogram descriptors and to use the histogram descriptors to search content and make determinations about content in accordance with at least one embodiment. FIG. 2 depicts aspects of an example computerized system 200 in accordance with at least one embodiment. The system 200 may include a data store 202, an application module 204, and a search module 205. The data store 202 may include a collection of content 206, feature vectors 208 characterizing the collection of content 206, histogram descriptors 210 characterizing the collection of content 206, an index tree 212 that organizes the collection of content 206 around, for example, the feature vectors 208 and histogram descriptors 210, edge images 234 and contour images 238 that provide representations of images in the collection of content 206, and training images 242 and corresponding training contour histograms 246 for use when classifying images. The application module 204 may include a feature vector module 214, an index module 216, a histogram module 220, an edge image module 224, and a contour module 228. The search module 205 may include a search user interface (UI) module 218 capable of facilitating user interaction with the system 200. The search module 205 may search the index tree 212 to identify feature vectors 208 and/or histogram descriptors 210 and, ultimately, content in the collection 206, that is similar to query content.

The arrows between the modules 202, 204, 206 in FIG. 2 indicate that the modules 202, 204, 206 are communicatively coupled, for example, by a communication network in a computer and/or between a plurality of computers such as the servers 106, 108, 120 of FIG. 1. For example, the search module 205 may be hosted and/or implemented at least in part by the application server 108, the data store 202 may incorporate and/or be incorporated at least in part by the data store 110, and the application module 204 may be hosted and/or implemented at least in part by the development server 120.

The collection of content 206 may include any suitable content. Examples of suitable content include electronic records, data structures, data objects, representations including representations of goods such as physical goods and commercial goods and representations of services such as commercial services, documents, document collections, images (including digital images in any suitable image format), audio, video, and suitable combinations thereof. Examples of suitable image formats include digital image formats such as raster formats including bitmaps (e.g., BMP), compressed images in accordance with a Joint Photographic Experts Group (JPEG) standard, graphics interchange formats (e.g., GIF), and portable network graphics formats (e.g., PNG), as well as vector formats such as computer graphics metafile formats (e.g., CGM) and scalable vector graphics formats (e.g., SVG).

Each piece of content in the collection of content 206 may be characterized by one or more of the feature vectors 208 and histogram descriptors 210. Examples of suitable types of vector features include metrizable feature vectors having coordinates that correspond to one or more content features. Examples of suitable feature vectors include scale-invariant feature vectors such as the "SIFT keys" described in David G. Lowe, "Object Recognition from Local Scale-Invariant Features," Proceedings of the International Conference on Computer Vision, September, 1999. Feature vectors may be selected from a vector space with any suitable number of dimensions (e.g., 64 dimensions, 128 dimensions).

The index tree 212 may index the feature vectors 208 and/or the histogram descriptors 210 for identifying content in the collection 206 that is similar to query descriptors. The index module 216 may maintain (e.g., build, create, modify, and/or update) the index tree 212. The index module 216 may build the index tree 212 based at least in part on the feature vectors 208 and/or the histogram descriptors 210. Examples of building and searching index trees are provided in U.S. patent application Ser. No. 12/778,957 filed May 12, 2010 and entitled "Scalable Tree-Based Search of Content Descriptors," the contents of which are hereby incorporated in its entirety by reference. Further examples of building and searching index trees are provided in U.S. patent application Ser. No. 12/779,741 filed May 13, 2010 and entitled "Scalable Tree Builds for Content Descriptor Search," the contents of which are hereby incorporated in its entirety by reference.

The search UI module 218 may provide information from the search module 205 for presentation. For example, the search UI module 218 may generate a search user interface (UI) presentation specification and provide the specification to the client device 102 (FIG. 1) through the network 104. The search UI module 218 may specify the search UI presentation with any suitable presentation specification language including suitable hypertext markup languages (e.g., HTML) and suitable programming and/or scripting languages (e.g., JavaScript). The search UI module 218 may receive information responsive to the search UI presentation. For example, the search UI module 218 may receive search requests from the client device 102, process received requests, and activate associated search module 205 functionality in response. For example, the search request may include reference to a piece of content already in the collection 206 and a request to search for other pieces of similar content in the collection 206. Also, for example, the search request may include a piece of query content not included in the collection 206 and a request to search for similar pieces of content in the collection 206. The query content may be of any type included in the collection 206 and/or for which valid query descriptors corresponding to those included in the feature vectors 208 and/or the histogram descriptors 210 may be generated. The search module 205 may generate a set of query descriptors characterizing the query content, for example, in a same and/or similar manner that the feature vectors 208 and the histogram descriptors 210 are generated for the collection of content 206. The search module 205 may determine a subset of the feature vectors 208 and/or the histogram descriptors 210 that are nearest the set of query descriptors with respect to a specified metric. For example, the search module 205 may determine the histogram descriptors 210 nearest the set of query descriptors at least in part by searching across the index tree 212.

Each piece of content in the collection of content 206 may be categorized into one or more categories ("content categories"). Any suitable category may be utilized to categorize content in the collection of content 206. Examples of suitable content categories include categories based at least in part on a type of the content, content attributes, content metadata, common associations with the content, popular associations with the content, organizational units, commercial departments associated with the content, commercial brands associated with the content, demographic categories associated with the content, purposes of the content, and suitable combinations thereof. A set of categories categorizing the collection of content 206 may be arranged hierarchically in a category tree 250 as described below in more detail with reference to FIG. 15.

A subset of the set of categories in the category tree 250 may be determined to be visually significant. A set of visually significant category data 252 may be established and/or maintained that references and/or defines the visually significant categories of the category tree 250. As described below in more detail with reference to FIG. 17, the set of visually significant category data 252 may also include support data to facilitate efficient and/or effective category-aware searches with respect to visual similarity ("category-aware visual similarity searches"). The visually significant category data 252 may be established and/or maintained by a visually significant category data maintenance module 254 as described below in more detail with reference to FIG. 18, FIG. 19 and FIG. 20. The search module 205 may include a visually significant category module 256 configured at least to facilitate category-aware visual similarity searches as described below in more detail with reference to FIG. 18 and FIG. 21.

The visually significant category data 252 may be established or "built" prior to receiving search queries with respect to visual similarity by a visually significant category data maintenance module 254. Alternatively, or in addition, the data store 202 may maintain multiple versions of the visually significant category data 252 including an "in production" version utilized by the search module 205 to facilitate category-aware visual similarity searches, and one or more "under construction" versions established and/or maintained by a visually significant category data maintenance module 254 that take into account changes in the system 200 since the current "in production" version, for example, changes to the collection of content 206 and/or the category tree 250.

Figure 3:
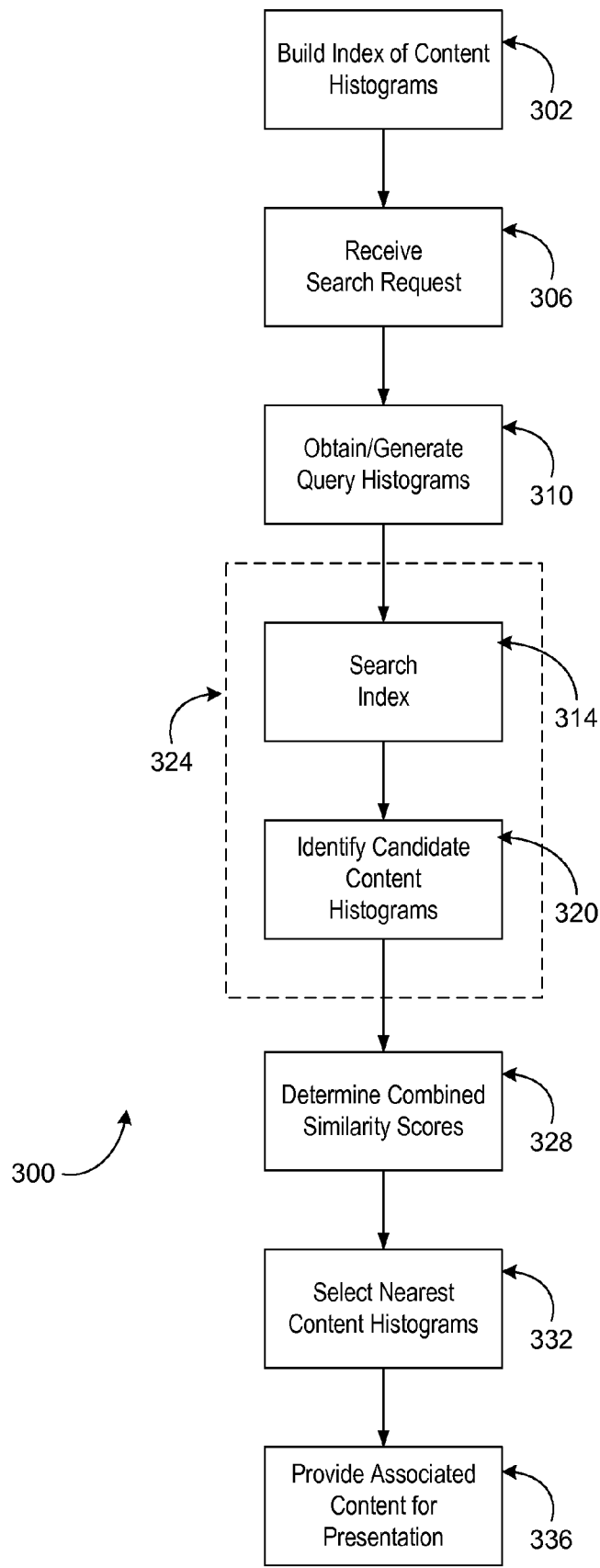
FIG. 3 is a flowchart depicting example steps for searching a collection of content in accordance with at least one embodiment.

Before describing example steps for creating and using histogram descriptors to search and classify content in accordance with at least one embodiment, it will be helpful to provide an example procedural context. FIG. 3 is a flowchart depicting example steps for searching histogram descriptors that characterize a collection of content in accordance with at least one embodiment. At step 302, the index tree 212 may be built around the histogram descriptors 210. Building the index tree 212 may involve significant use of computation resources and time. Accordingly, step 302 may be a preparatory step to servicing search requests and/or performed relatively infrequently with respect to search request servicing and/or according to a schedule.

At step 306, a search request may be received. For example, the search module 205 (FIG. 2) may receive the search request from the client device 102 (FIG. 1). The search request may include at least a reference to query content. For example, the search request may include a query image or a reference, such as a uniform resource locator (URL), to a query image. At step 310, a set of query descriptors may be obtained or determined for the query content. For example, if the query content is not part of the collection 206 and does not already have associated histogram descriptors, then the search module 205 may generate histogram descriptors for the query content in a same and/or similar manner that the histogram descriptors 210 are generated for the collection of content 206, as described below with reference to FIGS. 4-9, for example. Also, for example, if the query content is part of the collection 206, then, at step 310, the histogram descriptors 210 for the query content may be obtained from the data store 202.

At step 314, the index tree 212 (FIG. 2) may be searched. For example, the search module 205 may search the index tree 212 to, as indicated at step 320 identify a set of candidate content histogram descriptors 210. Dashed line 324 indicates that steps 314 and 320 may be integral. For example, identification of the set of candidate content histogram descriptors 210 may be integral to searching the index tree 212. Further, according to some embodiments, steps 314 and 320 may be omitted from the process 300.

At step 328, similarity scores are calculated based on the distance between the one or more query histogram descriptors and the one or more candidate content histogram descriptors 210. For example, the search module 205 (FIG. 2) may determine the distances with respect to the metric of the descriptor space in which the query histogram descriptors and the content histogram descriptors are located (e.g., as points or vectors). At step 332, a set of nearest content histogram descriptors may be selected. For example, the search module 205 may select a subset of the candidate content histogram descriptors nearest the query histogram descriptors with respect to the similarity scores determined at step 328. At step 336, content in the collection 206 associated with the subset of nearest content histogram descriptors selected at step 332 may be provided for presentation, thereby resulting in the presentation of content from the collection 206 that is similar to the query content. For example, the search module 205 may determine content in the collection 206 that corresponds to the set of nearest content histogram descriptors selected at step 332 and provide at least reference to the corresponding content to the client device 102 (FIG. 1).

Figure 4:
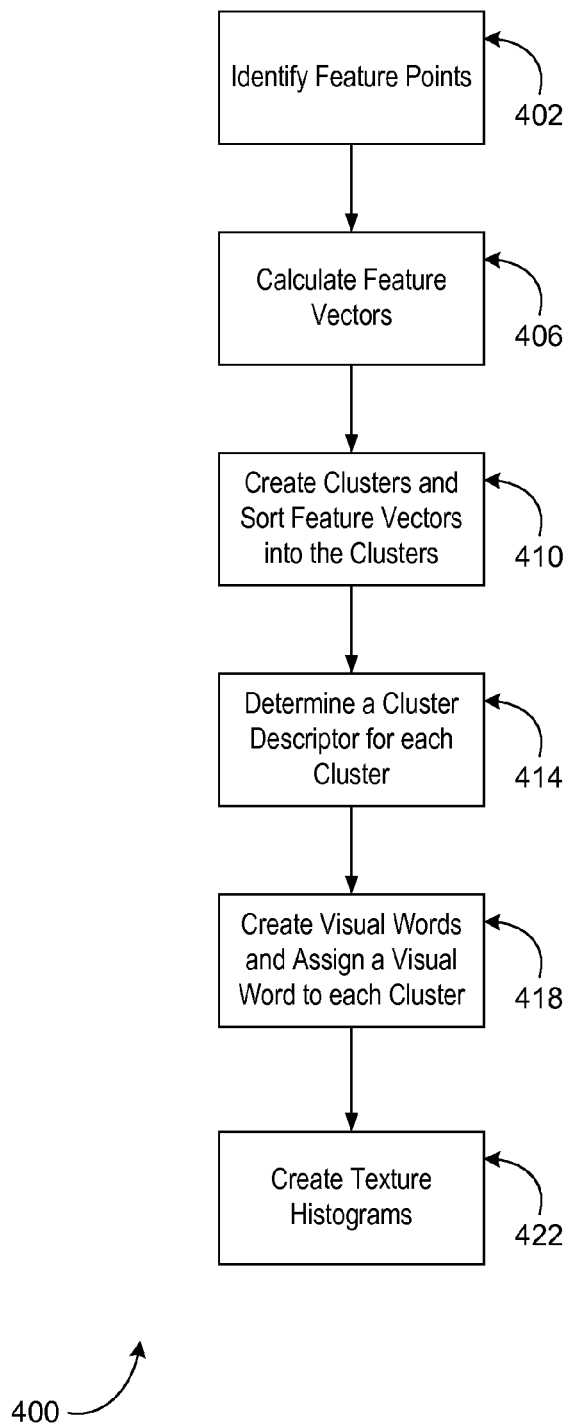
FIG. 4 is a flowchart depicting example steps for creating histograms in accordance with at least one embodiment.
Figure 5:
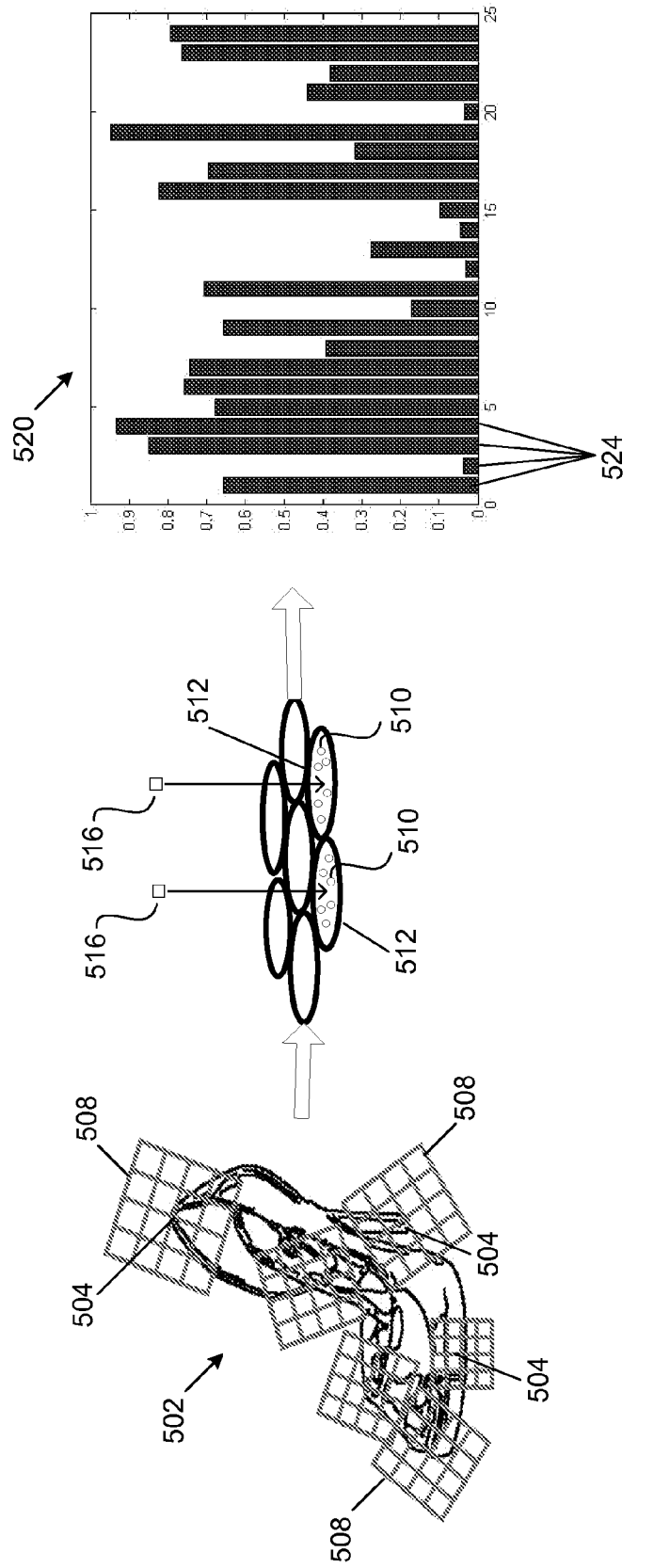
FIG. 5 is a schematic diagram depicting aspects of example steps for creating histograms in accordance with at least one embodiment.

Histogram descriptors and methods for creating histogram descriptors will now be discussed with reference to FIGS. 4-9, for example. For illustrative convenience and clarity, the collection of content 206 is described in the examples provided below with reference to FIGS. 4-9, for example, as being a collection of images 206. It should be appreciated, however, that the collection of content 206 is not limited to a collection of images. FIG. 4 depicts an example process 400 for creating a first type of histogram descriptor for the images of the collection of images 206 in accordance with at least one embodiment. Further, FIG. 5 provides a schematic diagram 500 depicting creating the first type of histogram descriptor for an example image 502 in accordance with at least one embodiment. According to the illustrated embodiment, the histogram descriptors created in accordance with FIGS. 4 and 5 are local-texture histogram descriptors that describe patterns that exist in individual images of the collection 206. For example, if an image is of a shoe that has laces and a checker-board pattern, the local-texture descriptor provides a representation of the checker-board pattern and the laces.

As indicated at step 402, the process 400 of creating local-texture histogram descriptors for the individual images in the collection of images 206 generally begins with identifying the feature points of the images of the collection 206. Feature points are specific points in an image which are robust to changes in image rotation, scale, viewpoint or lighting conditions. Feature points are sometimes referred to as points of interest. For example, to identify feature points of an image, the image may be smoothed and down-sampled into image pyramids, each of which contain several pyramid images. Feature points may then be identified in the pyramid images by finding the Harris corner measure at different points in the pyramid images. For example, the local maxima in the Harris corner measure may be identified as feature points. According to some embodiments, these identified feature points are invariant to certain transformations of the images, like zooming, scaling and rotation of the image. Examples of feature points are illustrated at 504 in FIG. 5.

As indicated at step 406, after the feature points of the images are identified, feature vectors for the feature points are calculated. According to the embodiment illustrated in FIG. 5, to calculate feature vectors of image 502, the orientations of the feature points 504 of the image 502 are determined. For example, a set of orientation calculating algorithms may use the gradient of the image 502 to determine the orientations of the feature points 504. Then, according to the illustrated embodiment, patches 508 are extracted around each of the feature points 504. The patches 508 are then converted to feature vectors using standard techniques. The feature vectors of image 502 are represented at 510 in FIG. 5. Examples of suitable feature vectors include scale-invariant feature vectors such as the "SIFT keys" described in David G. Lowe, "Object Recognition from Local Scale-Invariant Features," Proceedings of the International Conference on Computer Vision, September, 1999. Further examples of feature vectors and methods for calculating feature vectors are provided in U.S. patent application Ser. No. 12/319,992 filed Jan. 14, 2009 and entitled "Method and System for Representing Image Patches," the contents of which are hereby incorporated in its entirety by reference.

As indicated at step 410, after the feature vectors of the images of the collection 206 are calculated, clusters are created and the feature vectors are sorted into the clusters. According to some embodiments, step 410 is executed by the index module 216. For example, when creating the index tree 212 for the collection 206, the index module 216 may cluster the feature vectors of the images into the respective clusters. For example, the index module 216 may create clusters and sort feature vectors to the clusters by utilizing a conventional hierarchical k-means clustering technique, such as that described in Nistér et al., "Scalable Recognition with a Vocabulary Tree," Proceedings of the Institute of Electrical and Electronics Engineers (IEEE) Conference on Computer Vision and Pattern Recognition (CVPR), 2006. FIG. 5 schematically illustrates nodes or clusters 512 having feature vectors 510 clustered therein. For clarity, only two of the clusters 512 are labeled and not all clusters 512 are shown having feature vectors 510 clustered therein. However, it should be appreciated that any number of clusters 512 may exist and that each of the clusters 512 can include feature vectors 510.

Next, as indicated at step 414, a cluster descriptor is determined for each of the clusters that were created according to step 410. Like feature vectors, cluster descriptors may be viewed as vectors in a vector space. Furthermore, cluster descriptors may be based at least in part on the feature vectors of the clusters they characterize. For example, in operation, the index module 216 may calculate a cluster descriptor for a cluster, where the cluster descriptor corresponds to a point in the descriptor space that is a mean and/or a center (e.g., a geometric center) of the feature vectors in the cluster. FIG. 5 schematically illustrates cluster descriptors at 516. As indicated above, the cluster descriptor 516 of a particular cluster 512 correspond to the mean and/or center of the feature vectors 510 that are grouped in the cluster 512.

As indicated at step 418, in an addition to providing a cluster descriptor for each cluster, a visual word is provided for each cluster. According to some embodiments, the visual words are labels that represent the clusters, but—unlike the cluster descriptors—the visual words do not include location information for the clusters. Accordingly, by excluding location information from the visual words, the visual words may be categorized, searched, or otherwise manipulated relatively quickly. In operation, according to an embodiment, the index module 216 assigns a visual word to each of the clusters.

According to some embodiments, step 402 (identifying feature points), step 406 (calculating feature vectors), step 410 (clustering feature vectors), step 414 (calculating cluster descriptors), and step 418 (assigning visual words) may be part of an initial build phase of building the index tree 212. For example, after completion of step 418 for the images of the collection 206, the index module 216 will have completed an initial build phase of the index tree 212, which will be further developed and refined as additional images are added to the collection of images 206.

As indicated at step 422, a local-texture histogram is created for the images of the collection of images 206. According to an embodiment, each local-texture histogram is created with a number of bins that correspond to the number of clusters created for the collection 206 in step 410. Because each cluster is associated with a visual word, the number of bins also corresponds to the number of visual words assigned to the collection 208. Each bin of a particular local-texture histogram is populated with data that indicates the number of the feature vectors of the image that were mapped to the cluster that corresponds to the bin. Accordingly, because each cluster is represented by a visual word, the data included in a bin of a local-texture histogram of an image indicates the number of feature vectors associated with each visual word. An example local-texture histogram is provided in FIG. 5 at 520. In operation, to create a local-texture histogram 520 for image 502, the histogram module 220 creates a bin 524 for each visual word that was created in step 418. Then, the histogram module 220 provides each bin 524 with data that indicates the number feature vectors assigned to the visual word associated with the bin.

Figure 6:
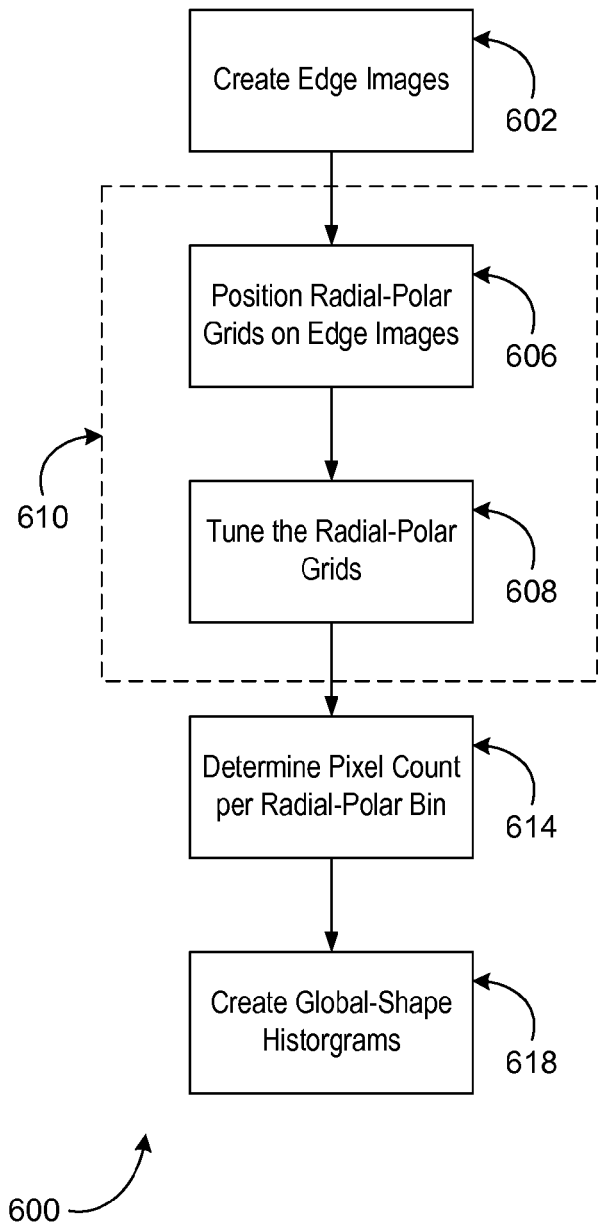
FIG. 6 is a flowchart depicting example steps for creating histograms in accordance with at least one embodiment.
Figure 7:
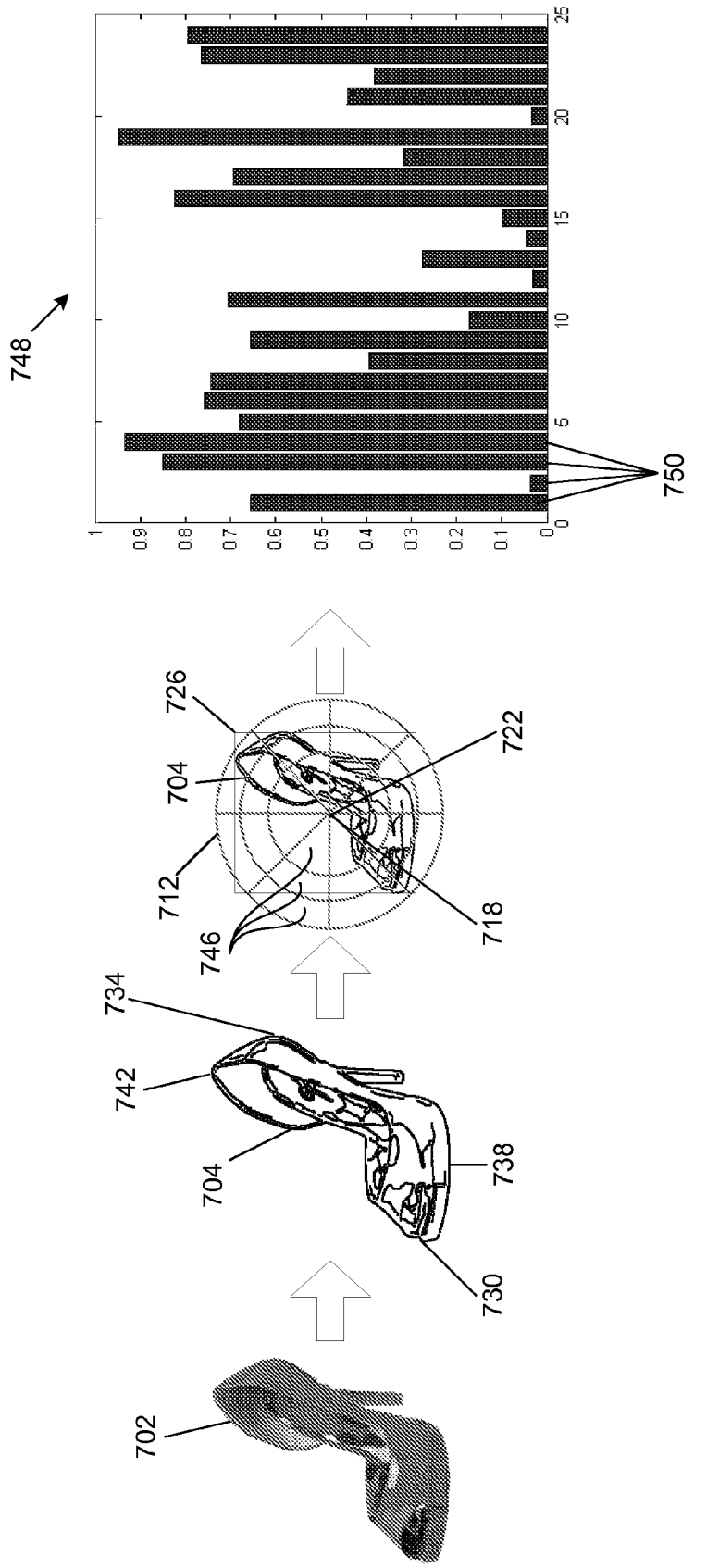
FIG. 7 is a schematic diagram depicting aspects of example steps for creating histograms in accordance with at least one embodiment.

FIG. 6 depicts an example process 600 for creating a second type of histogram descriptor for the images of the collection of images 206 in accordance with at least one embodiment. Further, FIG. 7 provides a schematic diagram 700 of creating the second type of histogram descriptor for an example image 702 in accordance with at least one embodiment. According to the illustrated embodiment, the histogram descriptors created in accordance with FIGS. 6 and 7 are global-shape histogram descriptors that describe the overall shape of the image. For example, if an image is of a shoe, the global-shape histogram descriptor provides a representation of the overall shape of the shoe.

As indicated at step 602, the process 600 of generating global-shape histogram descriptors for the individual images in the collection of images 206 generally begins with creating edge images of the images of the collection 206. It should be appreciated that edge images may be created using any techniques and methods known in the art, such as edge detection algorithms that use Canny edge detection or Sobel operators. According to some embodiments, when creating edge images for the images, the step of thinning, which is associated with most edge detection techniques, may be omitted because the global-shape histogram descriptors are robust to edge detection techniques that result in thick edges. An example edge image of an image 702 is illustrated in FIG. 7 at 704.

As indicated at step 606, after edge images of the images of the collection 206 are created, radial-polar grids are positioned on the edge images. An example radial-polar grid 712 is illustrated in FIG. 7 as being positioned over the edge image 704. According the embodiment represented in FIG. 7, a center 718 of the radial-polar grid 712 is aligned with a center 722 of a bounding box 726 of the edge image 704. The bounding box 726 is defined by a left-most pixel 730, a right-most pixel 734, a bottom-most pixel 738, and a top-most pixel 742 of the edge image 704. Each of the radial-polar grids comprises radial-polar bins. For example, as illustrated in FIG. 7, the radial-polar grid 712 includes a plurality of radial polar bins, which are indicated at 746. Although, for illustrative convenience, only three radial-polar bins are indicated by 746, the illustrated radial-polar grid 712 comprises twenty-four radial polar bins 746. It should be appreciated that the number and size of radial-polar bins of the radial-polar grid may vary relative to the underlying edge image. For example, as indicated at step 608, tuning the radial-polar grid to return the best results may be accomplished by varying the number and size of the radial-polar bins. According to some embodiments, the number and size of the radial-polar bins are varied by varying the size and number of angular bins and radial bins of the radial-polar grid. According to some embodiments, the number of angular bins range from eight to sixteen and the number of radial bins range from three to eight. For example, tuning may be performed by visual inspection of the similarity results and comparison of the similarity results against a human labeled ground truth collection. Dashed line 610 indicates that steps 606 and 608 may be integral. For example, positioning the radial-polar grid over the edge image may be integral to tuning the radial-polar grid by varying the number and size of the radial-polar bins.

As indicated at step 614, after radial-polar grids are positioned and tuned over the edge images, the number of pixels of the edge images that are located in the radial-polar bins of the radial-polar grids are determined. For example, with reference to FIG. 7, after a radial-polar grid 712 is positioned and tuned over the edge image 704, step 614 contemplates counting the number of pixels of the edge image 704 that are located in each radial-polar bin 746 of the radial-polar grid 712.

Next, as indicated at step 618, a global-shape histogram is created for the images in the collection of images 206. According to an embodiment, each global-shape histogram is created with a number of bins that correspond to the radial-polar bins of the radial-polar grid positioned on the edge image of the image, where the contents of the bins include data that represents the number of pixels in the corresponding radial-polar bins. An example global-shape histogram 748 is provided in FIG. 7. In operation, to create a global-shape histogram 748 for image 702, the histogram module 220 creates a bin 750 for each radial-polar bin 746 of the radial-polar gird 712. Then, the histogram module 220 assigns data to each bin 750 of the histogram 748 that reflects the number of pixels of the edge image 704 that are located in corresponding the radial-polar bin 746. Accordingly, the global-shape histogram indicates the number of radial-polar bins that are positioned over the edge image and the number of pixels of the edge image that are located in each the respective radial-polar bins.

Figure 8:
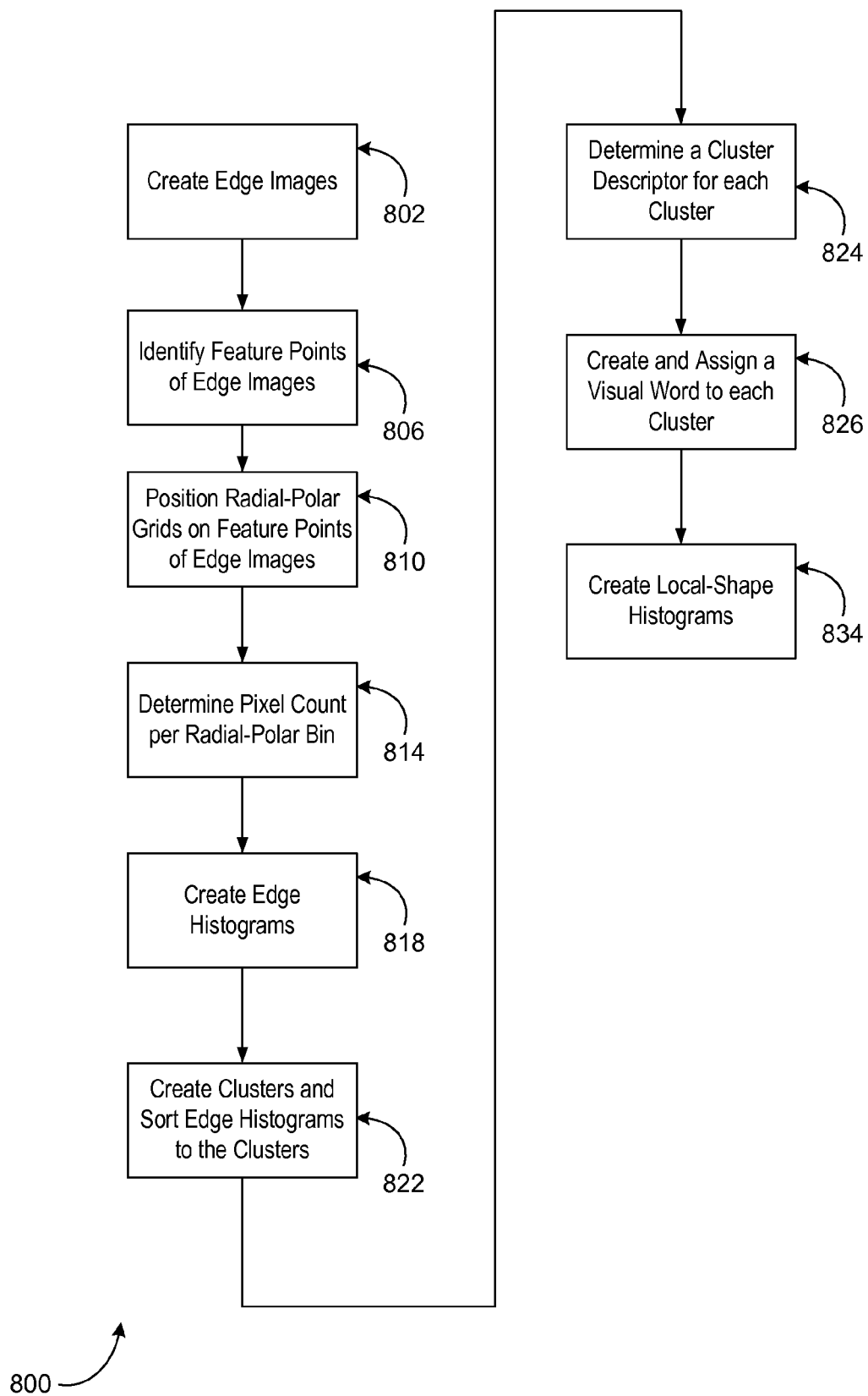
FIG. 8 is a flowchart depicting example steps for creating histograms in accordance with at least one embodiment.
Figure 9:
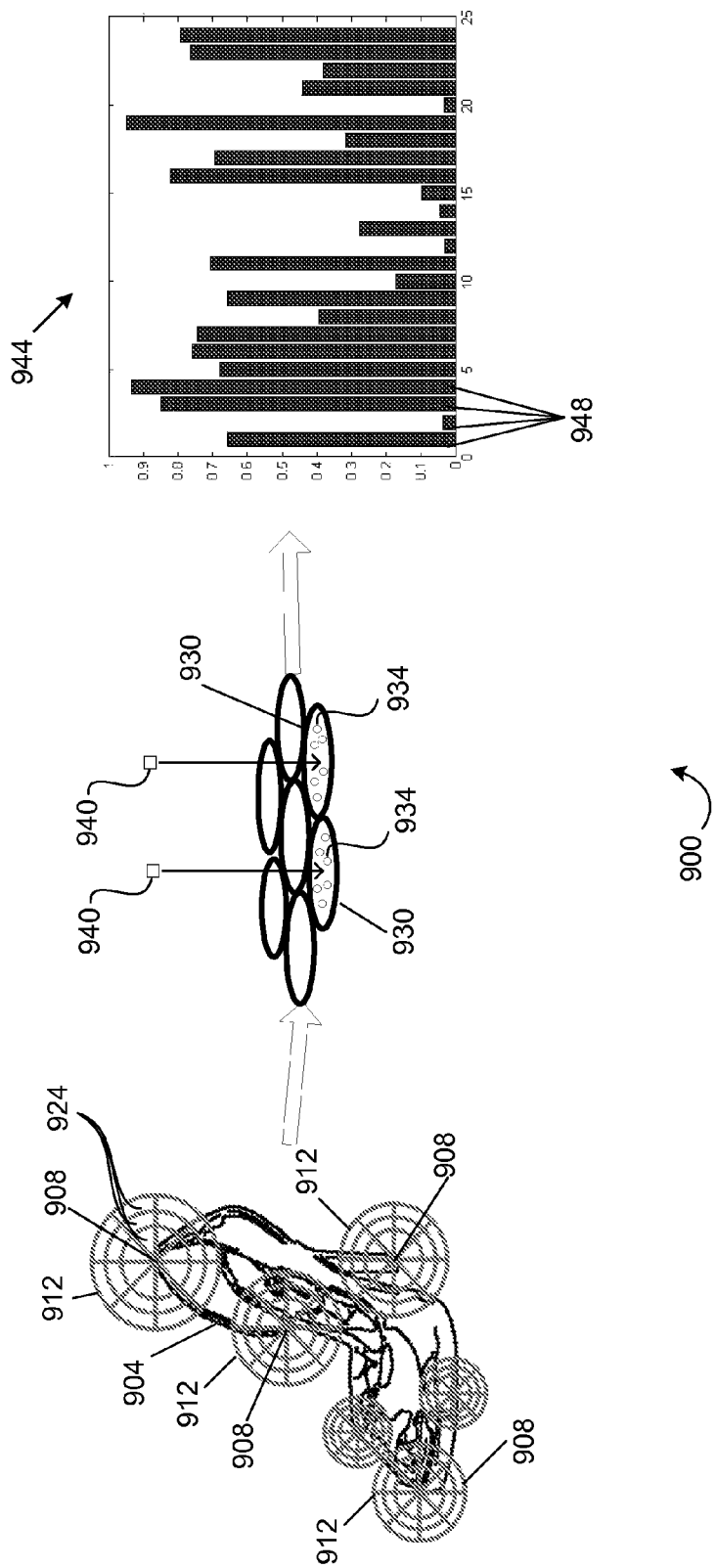
FIG. 9 is a schematic diagram depicting aspects of example steps for creating histograms in accordance with at least one embodiment.

FIG. 8 depicts an example process 800 for creating a third type of histogram descriptor for the images of the collection of images 206 in accordance with at least one embodiment. Further, FIG. 9 provides a schematic diagram 900 of creating the third type of histogram descriptor for an example image in accordance with at least one embodiment. According to the illustrated embodiment, the histogram descriptors created in accordance with FIGS. 8 and 9 are local-shape histogram descriptors that describe the local shape of the object reflected in the image.

As indicated at step 802, the process 800 of creating local-shape histogram descriptors for the individual images in the collection of images 206 generally begins with creating edge images of the images of the collection 206. As mentioned above, it should be appreciated that edge images may be created using any techniques and methods known in the art, such as edge detection algorithms that use Canny edge detection or Sobel operators. Further, when creating edge images for the images, the step of thinning, which associated with most edge detection techniques, may be omitted in some embodiments because the local-shape histogram descriptors are robust to edge detection techniques that result in thick edges. An example edge image 904 of an image is illustrated in FIG. 9.

Next, as indicated at step 806, the process 800 includes determining feature points for the edge images of the images of the collection 206. For example, with reference to FIG. 9, to determine feature points for an edge image 904, the original image that corresponds to the edge image 904 may be smoothed and down-sampled into image pyramids, each of which contain several pyramid images. Feature points 908 may then be identified in the pyramid images of the original image by finding the Harris corner measure at different points in the pyramid images. For example, the local maxima in the Harris corner measure are identified as feature points. The feature points of the original image may then be applied to the corresponding edge image 904. It should be appreciated that, instead of identifying feature points of the original image and then applying those feature points to the edge image, embodiments could identify the feature points of the edge image itself. For example, embodiments could smooth and down-sample the edge image into image pyramids and then identify the feature points of the pyramid images of the edge images using Harris corner detection. According to some embodiments, these identified feature points are invariant to certain transformations of the images, like zooming, scaling and rotation of the image.

As indicated at step 810, after the feature points of edge images are identified, radial-polar grids are positioned on the feature points of the edge images. Example radial-polar grids 912 are illustrated in FIG. 9 as being positioned over feature points 908 of the example edge image 904. Each of the radial-polar grids comprises radial-polar bins. For example, as illustrated in FIG. 9, each of the illustrated radial-polar grids 912 includes a plurality of radial polar bins, which are indicated at 924. Although, for illustrative convenience, only three of the radial-polar bins 924 of one radial-polar grid 912 are illustrated, it should be appreciated that each of the illustrated radial-polar grids 912 comprise twenty-four radial polar bins 924. It should also be appreciated that the number and size of radial-polar bins of the radial-polar grid may vary. For example, the radial-polar grids may be tuned by varying the number and size of the radial-polar bins. According to some embodiments, the number and size of the radial-polar bins are varied by varying the size and number of angular bins and radial bins of the radial-polar grids. According to some embodiments, the number of angular bins of each of the radial-polar grids range from eight to sixteen and the number of radial bins of the radial-polar grids range from three to eight.

Next, as indicated at step 814, after radial-polar grids are positioned over the feature points of the edge images, the number of pixels of the edge images that are located in the radial-polar bins of the radial-polar grids are determined. For example, with reference to FIG. 9, after a radial-polar grids 912 are positioned over the feature points 908 of the edge image 904, step 814 contemplates counting the number of pixels of the edge image 904 that are located in each radial-polar bin 924 of each radial-polar grid 912.

Next, as indicated at step 818, edge histograms are created for each of the feature points of the images in the collection of images 206. According to an embodiment, each edge histogram is created with a number of bins that correspond to the radial-polar bins of the radial-polar grids positioned on the feature points of edge images of the images, where the contents of the bins of the edge histograms represent the number of pixels in the corresponding radial-polar bins.

As indicated at step 822, after edge histograms are created for the feature points of the images of the collection 206, clusters are created and the edge histograms are sorted into the clusters. According to some embodiments, step 822 is executed by the index module 216. In FIG. 9, the clusters are schematically illustrated at 930 and the edge histograms are schematically illustrated at 934. For clarity, only two of the clusters 930 are labeled and not all clusters 930 are shown having edge histograms 934 clustered therein. However, it should be appreciated that each of the clusters 930 can include edge histograms 934. For example, when creating the index tree 212 for the collection 206, the index module 216 may cluster the edge histograms 934 of the images into the respective clusters 930. For example, as mentioned above with reference to FIGS. 4 and 5, the index module 216 may create clusters and sort edge histograms to the clusters by utilizing a conventional hierarchical k-means clustering technique, such as that described in Nistér et al., "Scalable Recognition with a Vocabulary Tree," Proceedings of the Institute of Electrical and Electronics Engineers (IEEE) Conference on Computer Vision and Pattern Recognition (CVPR), 2006.

Next, as indicated at step 824, a cluster descriptor is determined for each of the clusters that were created according to step 818. For example, if the edge histograms are converted to vectors, then the cluster descriptors may be based at least in part on the vectors that represent the edge histograms in each cluster. For example, in operation, the index module 216 may calculate a cluster descriptor for a cluster, where the cluster descriptor corresponds to a point in the descriptor space that is a mean and/or a center (e.g., a geometric center) of the vectors in the cluster that represent the edge histograms of the cluster. FIG. 9 schematically illustrates cluster descriptors at 940. As indicated above, the cluster descriptor 940 of a particular cluster 930 correspond to the mean and/or center of the vectors that represent the edge histograms 934 that are grouped in the cluster 930.

As indicated at step 826, in an addition to providing a cluster descriptor for each cluster, a visual word is provided for each cluster. According to some embodiments, the visual words are labels that represent the clusters, but—unlike the cluster descriptors—the visual words do not include location information for the clusters. Accordingly, by excluding location information from the visual words, the visual words may be categorized, searched, or otherwise manipulated relatively quickly. In operation, according to an embodiment, the index module 216 assigns a visual word to each of the clusters.

Next, as indicated at step 834, a local-shape histogram is created for each of the images in the collection of images 206. According to an embodiment, each local-shape histogram is created with a number of bins that correspond to the number of clusters created for the collection 206 in step 822. Each bin of a particular local-shape histogram is populated with data that indicates the number of the edge histograms of the image that were mapped the visual word that corresponds to the bin. Accordingly, because each visual word represents a cluster, the data included in a bin of a local-shape histogram of an image indicates the number of edge histograms of the image that were mapped to the cluster represented by the bin. An example local-shape histogram is provided in FIG. 9 at 944. In operation, to create a local-shape histogram 944 for an image of the collection 206, the histogram module 220 creates a bin 948 for each visual word that was created in step 826. Then, the histograms module 220 provides each bin 948 with data that indicates the number of edge histograms assigned to the visual word associated with the bin.

In light of the example processes 400, 600, 800 for generating local-texture, global-shape, and local-shape histogram descriptors 520, 748, 944 in accordance with at least one embodiment, it will be helpful revisit the example procedural context provided above with reference to FIG. 3. As mentioned above, FIG. 3 is a flowchart depicting example steps for searching the collection of content 206 in accordance with at least one embodiment. At step 302, the index tree 212 may be built around the local-texture, global-shape, and local-shape histogram descriptors 520, 748, 944, which are stored in histogram descriptors 210 of data store 202. At step 306, the search module 205 may receive from the client device 102 a request to identify images in the collection 206 that are visually similar to a query image. For example, the search request may include the query image or a reference to the query image. At step 310, local-texture, global-shape, and local-shape histogram descriptors 520, 748, 944 are obtained or determined for the query image. For example, if the query image is not part of the collection 206 and does not already have associated local-texture, global-shape, and local-shape histogram descriptors 520, 748, 944, then the search module 205 may generate local-texture, global-shape, and local-shape histogram descriptors 520, 748, 944 for the query image in a same and/or similar manner that the local-texture, global-shape, and local-shape histogram descriptors 520, 748, 944 were generated for the collection of content 206, as described above with reference to FIGS. 4-9, for example. Also, for example, if the query image is part of the collection 206, then, at step 310, the local-texture, global-shape, and local-shape histogram descriptors 520, 748, 944 for the query image may be obtained from the histogram descriptors 210 of the data store 202, because the histogram module 220 may have already created the histogram descriptors for the query image.

According to the steps of box 324, the collection of images 206 may be searched to identify a set of content images that are similar to the query image. Now that histogram descriptors have been calculated or obtained for the query image, comparing images can be accomplished by comparing the histogram descriptors of query images to the histogram descriptors of the images of the collection 206. For example, as indicated step 328, distances may be determined between the local-texture, global-shape, and local-shape histogram descriptors 520, 748, 944 of the query image and the local-texture, global-shape, and local-shape histogram descriptors 520, 748, 944 of the images in the collection of images 206. According to some embodiments, dot product comparisons are performed between the histogram descriptors (e.g., local-shape histogram is compared to other local-shape histograms; and global-shape histogram is compared to other global-shape histograms; etc) of the query image and the corresponding histogram descriptors of the images of the collection 206. The dot product comparisons are then normalized into similarity scores. Thus, between any two images, three similarity score are provided: (1) a similarity score between the local-texture histogram descriptors of the images; (2) a similarity score between the global-shape histogram descriptors of the images; and (3) a similarity score between the local-shape histogram descriptors of the images. After similarity scores are calculated between the different types of histogram descriptors of the images, the similarity scores are combined, as indicated at step 328. For example, the similarly scores may be combined by a linear combination or by a tree-based comparison that learns the combinations. For example, using a linear combination may provide the advantage of enabling a user to assign different weights to the different types of histogram descriptors, thereby causing the search module 205 to consider the weighting when selecting the nearest content histograms. It should be appreciated that instead of a dot product comparison, any distance metric could be used to determine distance between the different types of histogram descriptors, such as determining the Euclidian distance between the histogram descriptors.

As indicated at step 332, after the combined similarity scores are determined, a set of nearest histogram descriptors may be selected. For example, the search module 205 may select a subset of content histogram descriptors associated with images of the collection 206 that are nearest the query histogram descriptors as determined by the combined similarity scores. At step 336, images in the collection 206 associated with the subset of nearest histogram descriptors selected at step 332 may be provided for presentation. For example, the search module 205 may determine images in the collection 206 that match the set of nearest content histogram descriptors selected at step 332 and provide at least reference to the matching images to the client device 102 (FIG. 1).

With reference to FIGS. 2 and 10-15 systems and methods are provided for calculating histogram descriptors of contour images of images in accordance with at least one embodiment. Further, with reference to FIGS. 2 and 10-15, systems and methods are provided for classifying images associated with the contour images based in part on the histogram descriptors of the contour images. For example, images may be classified as being left-facing or right-facing images. According to this example, if an image is a left-facing image, then the object of the image faces left, whereas, if an image is a right-facing image, then the object of the image faces right.

Figure 10:
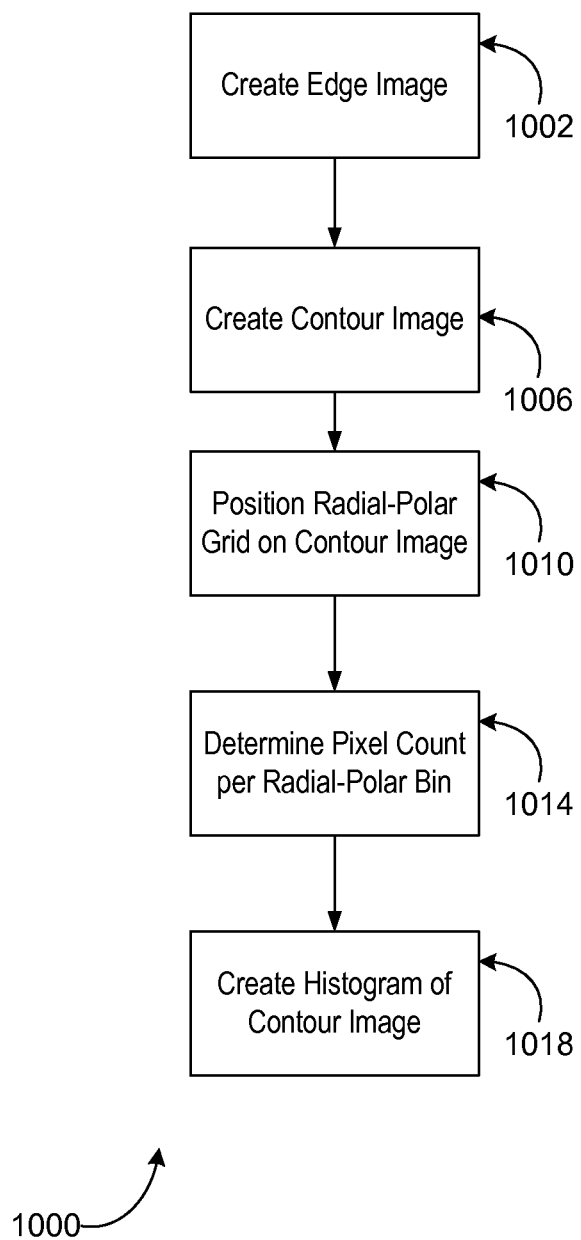
FIG. 10 is a flowchart depicting example steps for creating histograms in accordance with at least one embodiment.

FIG. 10 depicts an example process 1000 for creating contour images of images and then creating histogram descriptors of the contour images, in accordance with at least one embodiment. As indicated at step 1002, the process 1000 generally begins with creating edge images. As mentioned above, it should be appreciated that edge images may be created using any techniques and methods known in the art, such as edge detection algorithms that use Canny edge detection or Sobel operators. Further, as mentioned above, when creating edge images for the images, the step of thinning, which is associated with most edge detection techniques, may be omitted in some embodiments because the contour histogram descriptors are robust to edge detection techniques that result in thick edges.

Figure 12:
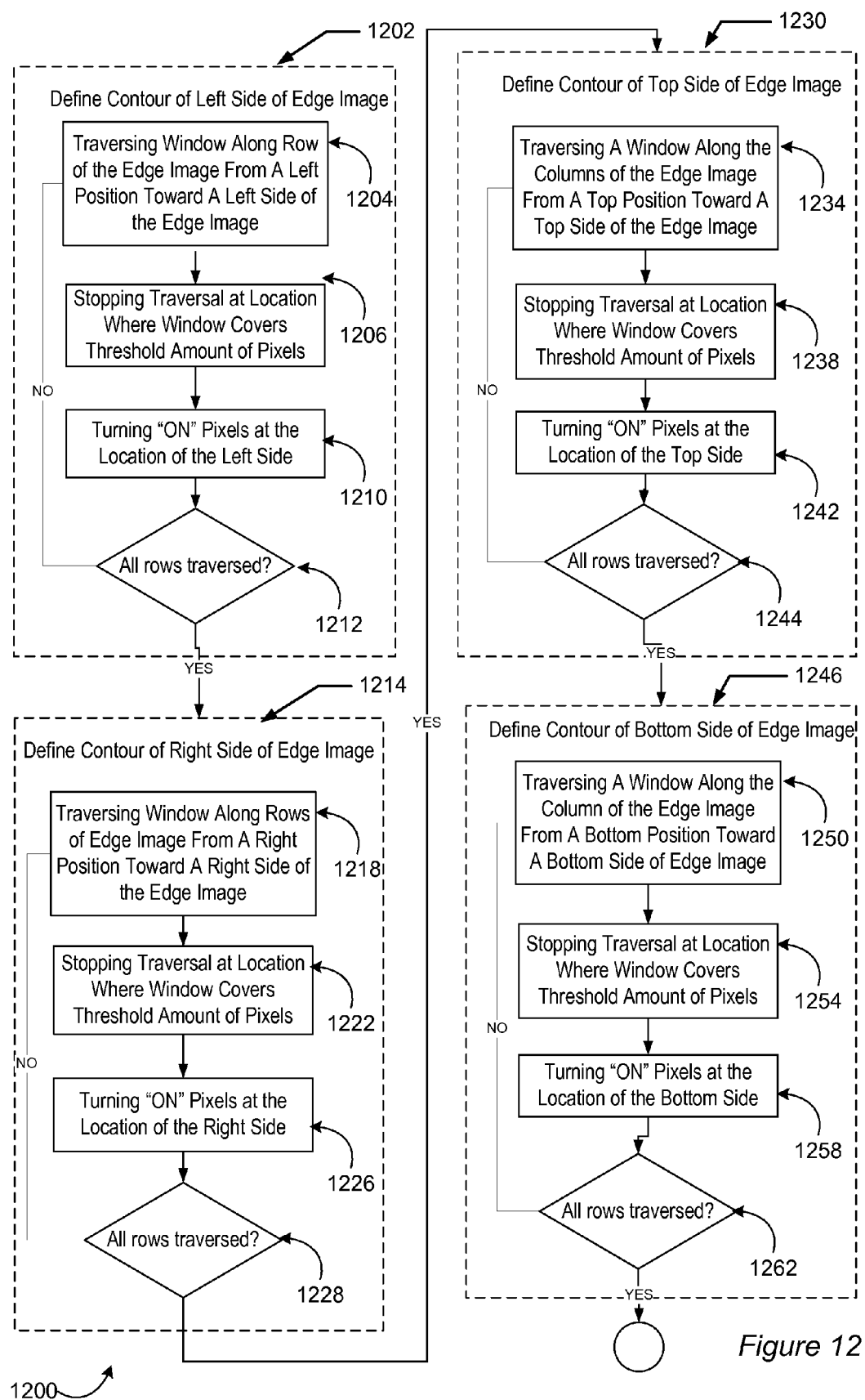
FIG. 12 is a flowchart depicting example steps for creating a contour image of an image in accordance with at least one embodiment.

Next, as indicated at step 1006, the process 1000 includes creating contour images based on the edge images created in step 1002. Example techniques for creating contour images will now be described with reference to FIGS. 12 and 13. FIG. 12 provides an example process for creating contour images. As indicated at box 1202, the process 1200 generally begins with determining a contour of the left side of the edge image, which comprises rows and columns of pixels. As indicated at step 1204, to determine a contour of the left side of the edge image, a window is traversed along the rows of the edge image from a position that is left of the left side of the image toward the left side of the edge image. According to an embodiment, the window is a small rectangle having a height that is approximately 4-5% of the height of the edge image and a width that is approximately 2-3% of the width of the edge image. Then, as indicated at step 1206, traversal of the window is stopped at a location where the window covers a threshold amount of pixels of the edge image and, as indicated at step 1210, the pixels at that location are turned "ON." The threshold prevents identifying false edges, such as shadows, as being part of the contour of the image. According to some embodiments, the threshold is based on the percentage of the window that covers pixels of the edge image at any given time. According to an embodiment, the threshold amount is met if approximately 60% of the window covers a pixel at any given time. For example, the threshold may be met if approximately 60% of the rows of the window covers pixels of the edge image. According to this example, if the window is twenty pixel-rows tall by five pixel-columns wide and if at any time at least twelve of the twenty rows cover a pixel, then the result is a vector that is twenty pixels tall, where all pixels of the vector are "ON" and become part of the resulting contour image. After finding an "ON" position of the row, traversal of the window in that row stops and the window is moved to another row for traversal. At step 1212, if all of the rows of the edge image have been traversed, then the contour of the left side of the edge image has been defined and the process continues to the steps of box 1214 for defining the contour of the right side of the edge image. However, if not all of the rows have been traversed, then the process 1200 returns to step 1204 and the window continues traversing the rows from left to right in order to define the contour of the left side of the image.

Figure 13:
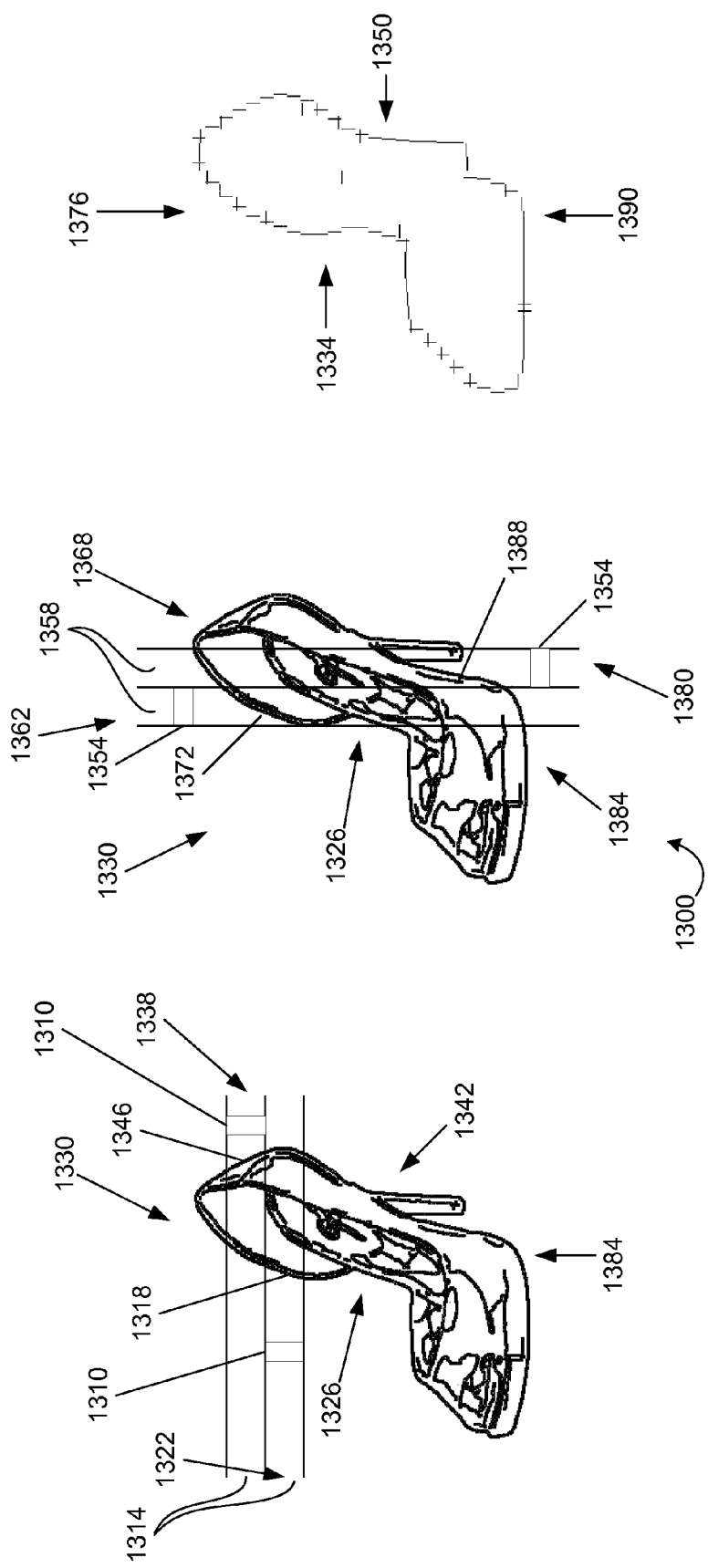
FIG. 13 is a schematic diagram depicting aspects of example steps for a contour image of an image in accordance with at least one embodiment.

The steps provided in box 1204 for defining a contour of the left side of the edge image will now be described with reference to FIG. 13. At step 1204, window 1310 is traversed along one of the rows 1314 from a left position generally indicated at 1322 toward the left side 1326 of an edge image 1330. Then, as indicated at step 1206, traversal of the window 1310 is stopped at a location 1318 on the left side 1326 where the window 1310 covers a threshold amount of pixels. At step 1210, the pixels at this location are turned "ON" and become part of the contour 1334 of the left side of the edge image.

After the window has traversed all of the rows from left to right in order to define the contour of the left side of the edge image, the process 1200 continues the steps indicated in box 1214 for defining the contour of the right side of the edge image. The steps of box 1214 are similar to the steps of box 1202, except at step 1218 the window is traversed from a position that is located to the right of the right side of the edge image toward the right side of the edge image (instead of a left position toward the left side). Then, as indicated at step 1222, traversal of the window is stopped at a location where the window covers a threshold amount of pixels of the edge image and, as indicated at step 1226, the pixels at that location are turned "ON." At step 1228, if all of the rows of the edge image have been traversed from right to left, then the contour of the right side of the edge image has been defined and the process continues to the steps of box 1230 for defining the contour of the top side of the edge image. However, if not all of the rows have been traversed, then the process 1200 returns to step 1218.

The steps provided in box 1214 will now be described with reference to FIG. 13. At step 1218, the window 1310 is traversed along one of the rows 1314 from a right position generally indicated at 1338 toward a right side 1342 of the edge image 1330. Then, as indicated at step 1222, traversal of the window 1310 is stopped at a location 1346 on the right side 1342 where the window 1310 covers a threshold amount of pixels. At step 1226, the pixels at location 1346 are turned "ON" and become part of the contour 1350 of the right side of the edge image.

After the window has traversed all of the rows from right to left in order to define the contour of the right side of the edge image, the process 1200 continues the steps indicated in box 1230 to define the contour of the top side of the edge image, which comprises rows and columns of pixels. As indicated at step 1234, a window is traversed down along the columns of the edge image from a top position that is located above the edge image, toward the top side of the edge image.

According to an embodiment, the window is a small rectangle having a width that is approximately 4-5% of the width of the edge image and a height that is approximately 2-3% of the height of the edge image. Next, as indicated at step 1238, traversal of the window is stopped at a location where the window covers a threshold amount of pixels of the edge image and, as indicated at step 1242, the pixels at that location are turned "ON." As mentioned above, the threshold prevents identifying false edges, such as shadows, as being part of the contour of the image. According to some embodiments, the threshold amount is based on the percentage of the window that covers pixels of the edge image at any given time. According to an embodiment, the threshold amount is met if approximately 60% of the window covers a pixel at any given time. For example, the threshold may be met if approximately 60% of the window covers pixels of the edge image. According to this example, if the window is twenty pixel-columns high by five pixel-columns high and if at any time at least twelve of the twenty columns cover a pixel, then the result is a vector that is twenty pixels wide, where all pixels of the vector are "ON" and become part of the resulting contour image. After finding an "ON" position of the column, traversal of the window in that column stops and the window is moved to another column for traversal. At step 1244, if all of the columns of the edge image have been traversed, then the contour of the top side of the edge image has been defined and the process 1200 continues to the steps of box 1246 for defining the contour of the bottom side. However, if not all of the columns have been traversed, then the process 1200 returns to step 1234 and the window continues traversing the columns from top to bottom in order to define the contour of the top side.

The steps provided in box 1230 will now be described with reference to FIG. 13. At step 1234, window 1354 is traversed along one of the columns 1358 from a top position generally indicated at 1362 toward the top side 1368 of the edge image 1330. Then, as indicated at step 1238, traversal of the window 1354 is stopped at a location 1372 on the top side 1368 where the window 1354 covers a threshold amount of pixels. At step 1242, the pixels at this location are turned "ON" and become part of the contour 1376 of the top side of the edge image.

After the window has traversed all of the columns from top to bottom in order to define the contour of the top side of the edge image, the process 1200 continues the steps indicated in box 1246 for defining the contour of a bottom side of the edge image. At step 1250 the window is traversed up from a bottom position that is located below the edge image toward the bottom side of the edge image. Then, as indicated at step 1254, traversal of the window is stopped at a location where the window covers a threshold amount of pixels of the edge image and, as indicated at step 1258, the pixels at that location are turned "ON." At step 1262, if all of the columns of the edge image have been traversed from bottom to top, then the contour of the bottom side of the edge image has been defined. However, if not all of the columns have been traversed, then the process 1200 returns to step 1250 and the window continues traversing the columns.

The steps provided in box 1246 will now be described with reference to FIG. 13. At step 1250, the window 1354 is traversed along one of the columns 1358 from a bottom position generally indicated at 1380 toward the bottom side 1384 of the edge image 1330. Then, as indicated at step 1254, traversal of the window 1354 is stopped at a location 1388 on the bottom side 1384 where the window 1354 covers a threshold amount of pixels. At step 1258, the pixels at this location 1388 are turned "ON" and become part of the contour 1390 of the bottom side of the image.

After completing the steps of boxes 1202, 1214, 1230, 1246 of process 1200, a contour image for the edge image will have been created, according to step 1006 of FIG. 10. According to some embodiments, the contour module 228 executes the process 1200 to create the contour images 238. It will be appreciated that boxes 1202, 1214, 1230, 1246 of process 1200 may be executed in any order to create a contour image by defining the left, right, top, and bottom contours of the image.

Figure 11:
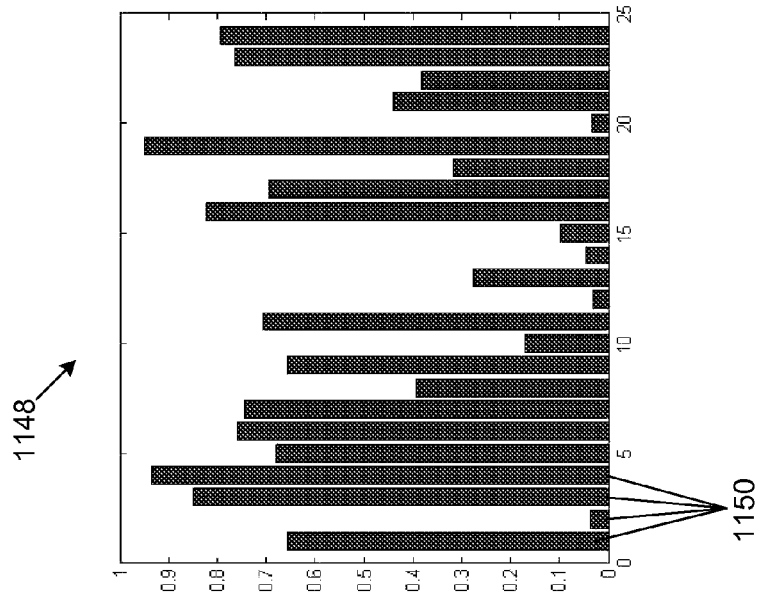
FIG. 11 is a schematic diagram depicting aspects of example steps for creating histograms in accordance with at least one embodiment.
Figure 11:
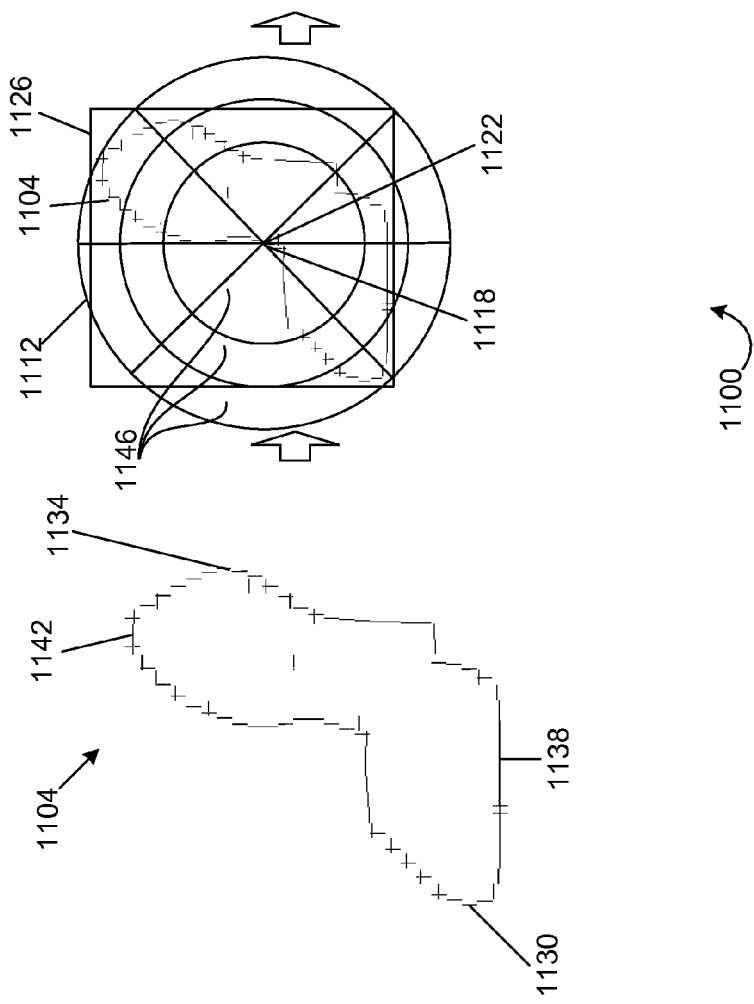

Next, as indicated at step 1010, the process 1000 of generating contour histogram descriptors for images involves positioning radial-polar grids on the contour images that were created according to step 1006. An example radial-polar grid 1112 is illustrated in FIG. 11 as being positioned over the contour image 1104. According the embodiment represented in FIG. 11, a center 1118 of the radial-polar grid 1112 is aligned with a center 1122 of a bounding box 1126 of the contour image 1104. The bounding box 1126 is defined by a left-most pixel 1130, a right-most pixel 1134, a bottom-most pixel 1138, and a top-most pixel 1142 of the contour image 1104. Each of the radial-polar grids comprises radial-polar bins. For example, as illustrated in FIG. 11, the radial-polar grid 1112 includes a plurality of radial polar bins, which are indicated at 1146. Although, for illustrative convenience, only three the radial-polar bins are indicated at 1146, the illustrated radial-polar grid 1112 comprises twenty-four radial polar bins 1146. It should be appreciated that the number and size of radial-polar bins of the radial-polar grid may vary relative to the underlying contour image. For example, the radial-polar grid may be tuned to return the best results by varying the number and size of the radial-polar bins. According to some embodiments, the number and size of the radial-polar bins are varied by varying the size and number of angular bins and radial bins of the radial-polar grid. According to some embodiments, the number of angular bins range from eight to sixteen and the number of radial bins range from three to eight. For example, tuning may be performed by visual inspection of the similarity results and comparison of the similarity results against a human labeled ground truth collection.

As indicated at step 1014, after radial-polar grids are positioned and tuned over the contour images, the number of pixels of the contour images that are located in the radial-polar bins of the radial-polar grids are determined. For example, with reference to FIG. 11, after a radial-polar grid 1112 is positioned and tuned over the contour image 1104, step 1014 contemplates counting the number of pixels of the contour image 1104 that are located in each radial-polar bin 1146 of the radial-polar grid 1112.

Next, as indicated at step 1018, histograms are created for the contour images. According to an embodiment, one histogram is created for each of the contour images and each histogram is created with a number of bins that correspond to the radial-polar bins of the radial-polar grid positioned on the contour image, where the contents of the bins represent the number of pixels in the corresponding radial-polar bins. An example histogram 1148 is provided in FIG. 11. In operation, to create a histogram 1148 for the contour image 1104, the histogram module 220 creates a bin 1150 for each radial-polar bin 1146 of the radial-polar gird 1112. Then, the histogram module 220 assigns data to each bin 1150 of the histogram 1148 that reflects the number of pixels of the contour image 1104 that are located in corresponding the radial-polar bin 1146. Accordingly, the histogram indicates the number of radial-polar bins that are positioned over the contour image and the number of pixels of the contour image that are located in each of the respective radial-polar bins.

Figure 14:
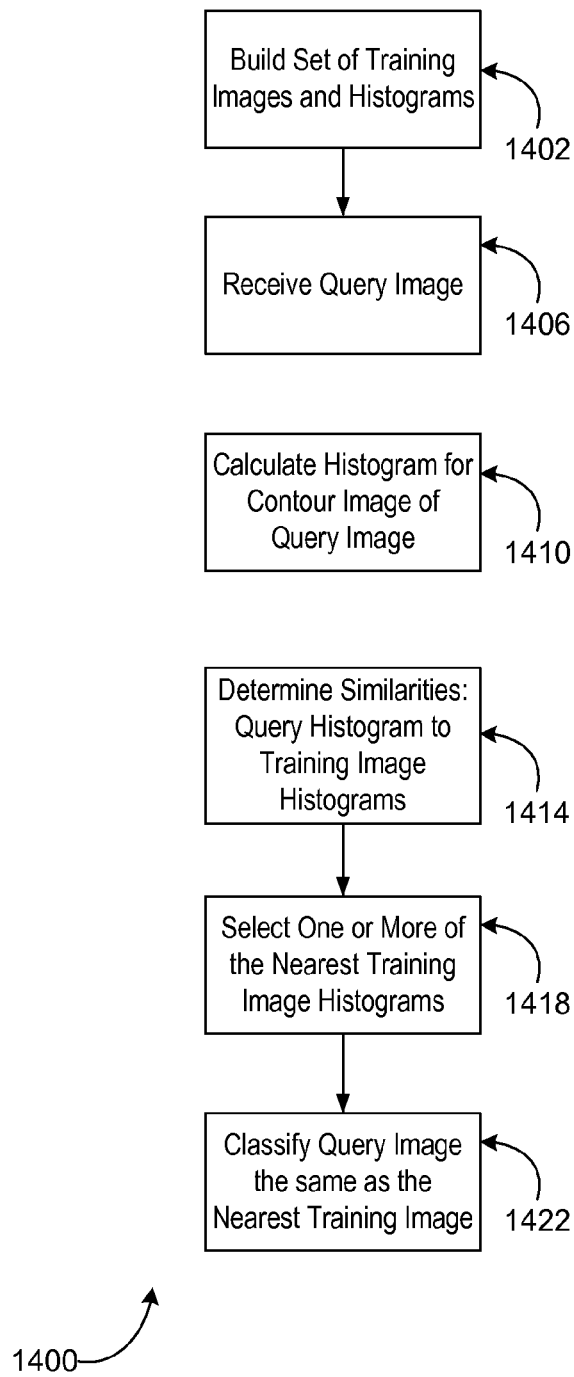
FIG. 14 is a flowchart depicting example steps for classifying an image in accordance with at least one embodiment.

With reference to FIG. 14, a process 1400 will be described for classifying images as being images of left- or right-facing objects. Process 1400 generally begins with building a set of training images and associated contour histograms, as indicated at step 1402. According to some embodiments, the training images 242 and corresponding training contour histograms 246 are located in data store 202 and include images and corresponding contour histograms of a number of different objects. According to some embodiments, the training images 242 include two images of each object, one image of the object facing in a right direction and another image of the object facing in a left direction. Further, the training contour histograms 246 include a histogram of a contour image of each image in the training images 242. The training histograms 246, according to some embodiments, are created according to the process 1000, which is described above with reference to FIGS. 10-13. Further, the training images 242 include, for each image, an indication of whether the object of the image is facing left or right. According to some embodiments, the indication of whether the object of the image is facing left or right may be determined by manual inspection.

At step 1406, a query image is received. For example, as mentioned above with regard to step 306 of FIG. 3, the search module 205 may receive from the client device 102 a request to identify images in the collection 206 that are visually similar to the query image. For example, the search request may include the query image or a reference to the query image. However, before visually similar images may be identified, according to some embodiments, a determination is made regarding whether the query image is of a left-facing or right-facing object, and then the search for visually similar images is limited to images of either left-facing or right-facing objects. To make the determination of whether the query image is of a left-facing or right-facing object, at step 1410, the histogram of the contour image of the query image is calculated according to the process 1000, and then, at step 1414, the histogram of the contour image of the query image is searched across the training contour histograms 246.

Then at step 1418, the nearest one of the training images 242 is selected by comparing the corresponding training contour histograms 246 to the histogram of the contour image of the query image. The nearest one of the training images 242 is the training image that corresponds to the nearest training contour histogram. According to some embodiments, dot product comparisons performed between the histogram of the contour image of the query image and the training histograms 246, which correspond to the training images 242. It should be appreciated, however, that instead of a dot product comparison, any distance metric could be used to determine distance between the different types of histograms, such as determining the Euclidian distance between the vectors.

As indicated at step 1422, after the nearest one of the training images is selected, the query image is classified as being an image of a right-facing or left-facing object based on whether the nearest one of the training images 242 is an image of a left-facing or right-facing object. After the query image has been classified as being an image of a left-facing or right-facing object, the collection of content 206 can then be searched for visually similar images according to process 300, or other similar processes, where the search is limited to images of the collection 206 that are images of either left- or right-facing objects.

Figure 15:
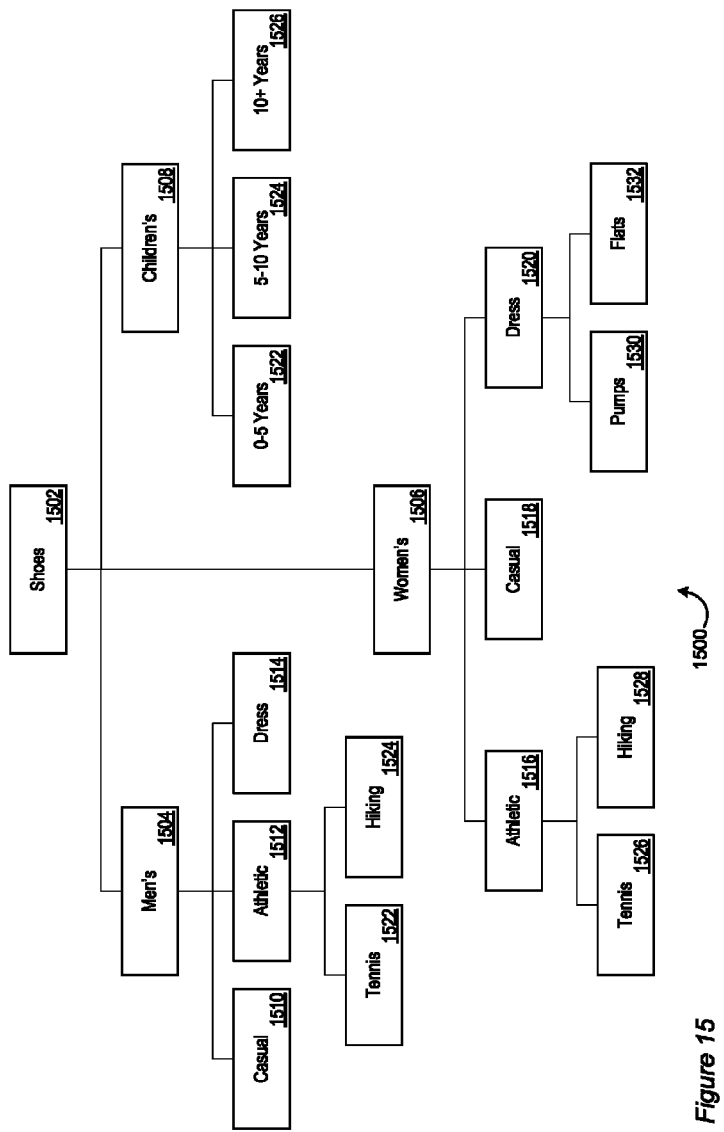
FIG. 15 is a schematic diagram depicting aspects of an example category tree in accordance with at least one embodiment.

As described above with reference to FIG. 2, the collection of content 206 may be categorized by content categories of the category tree 250. FIG. 15 depicts aspects of an example category tree 1500 in accordance with at least one embodiment. The category tree 1500 of FIG. 15 is an example sub-tree of the category tree 250 of FIG. 2.

In the example category tree 1500, a root or highest level category 1502 categorizes, references and/or contains (collectively, "categorizes") content in the collection of content 206 of FIG. 2 (e.g., images) corresponding to a particular type of physical object (i.e., shoes). A next lower (i.e., second) level of the category tree 1500 includes three sub-categories 1504, 1506, 1508 of the root category 1502. The three sub-categories 1504, 1506, 1508 categorize content in the collection of content 206 corresponding to demographic categories of users of the physical object, i.e., men's shoes, women's shoes and children's shoes, respectively.

A next lower (i.e., third) level of the category tree 1500 includes three sub-categories 1510-1514, 1516-1520, 1522-1526 for each of the categories 1504, 1506, 1508 of the previous level. Two of the sets of third level sub-categories 1510-1514 and 1516-1520 are duplicates categorizing content in the collection of content 206 (FIG. 2) corresponding to a purpose and/or role of the physical object with respect to the demographic of the parent category 1504, 1506, i.e., shoes appropriate for casual, athletic and dress situations for men and women, respectively. The third set of third level sub-categories 1522-1526 categorizes content in the collection of content 206 corresponding to a refinement of the parent demographic category 1508, i.e., shoes appropriate for children aged 0-5 years, 5-10 years and 10+ years, respectively.

A next lower (i.e., fourth) level of the category tree 1500 includes illustrative pairs of sub-categories 1522-1524, 1526-1528, 1530-1532. Two of those pairs 1522-1524 and 1526-1528 sub-categorize a particular purposed-based category 1512, 1516 in a same way, i.e., athletic shoes designed for tennis 1522, 1526, and athletic shoes designed for hiking 1524, 1528. The third pair 1530-1532 categorize content in the collection of content 206 (FIG. 2) corresponding to a shape and/or form of the physical object with respect to the purposed-based parent category 1520, i.e., pumps and flats, respectively.

Figure 16:
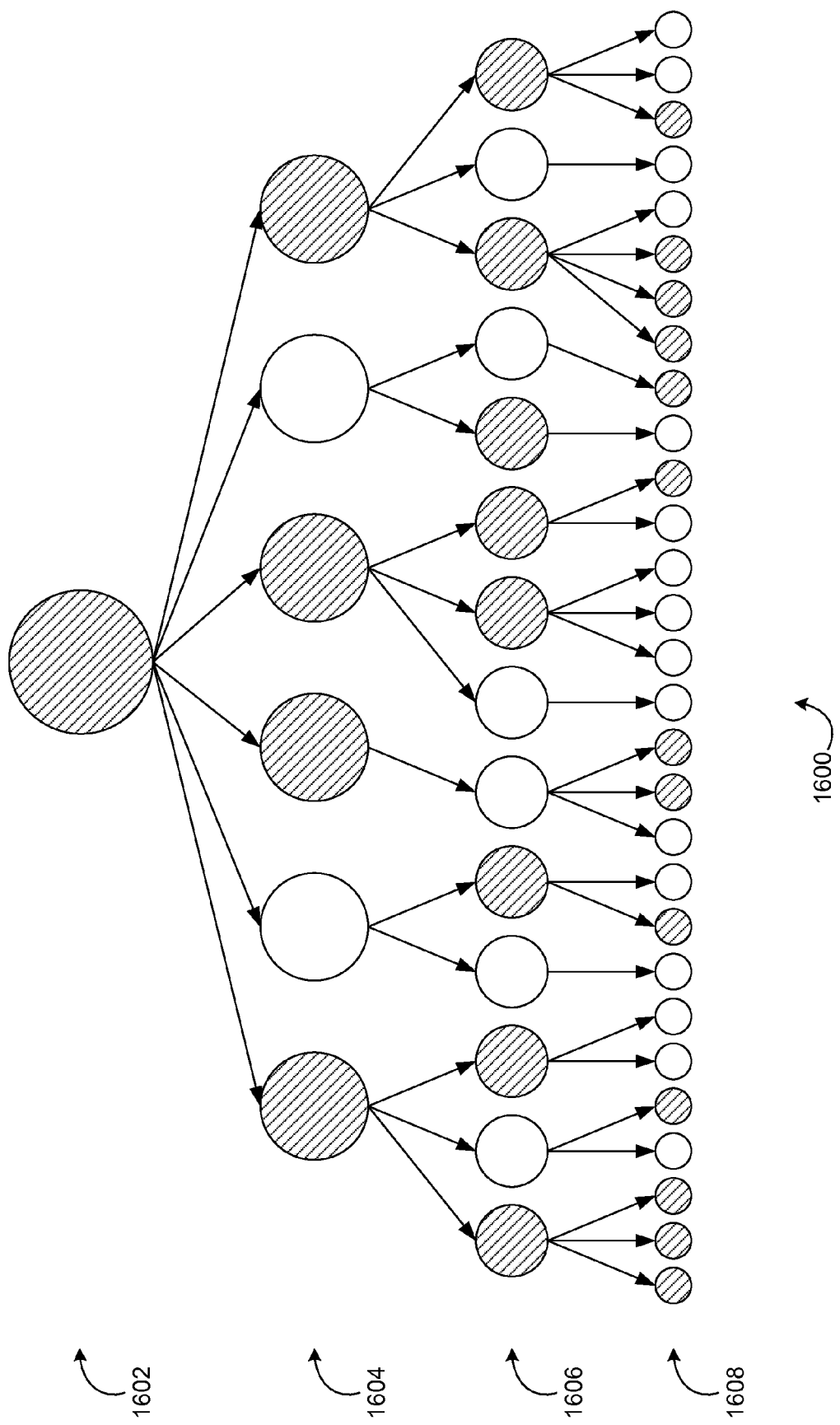
FIG. 16 is a schematic diagram depicting aspects of an example visually significant subset of a category tree in accordance with at least one embodiment.

In at least one embodiment, a subset of the categories in the category tree 250 (FIG. 2) are visually significant. FIG. 16 depicts aspects of an example visually significant subset of an example category tree 1600 in accordance with at least one embodiment. The category tree 1600 of FIG. 16 is an example sub-tree of the category tree 250 of FIG. 2. The category tree 1600 has a first level 1602 containing the root category of the category tree 1600, second and third levels 1604, 1606 containing categories with one or more sub-categories or child categories, and a fourth level 1608 containing childless categories or leaf categories of the category tree 1600. In FIG. 16, categories in the visually significant subset of the category tree 1600 are indicated by a circle filled with diagonal lines. Each visually significant category need not have a visually significant parent category in the category tree 1600.

Figure 17:
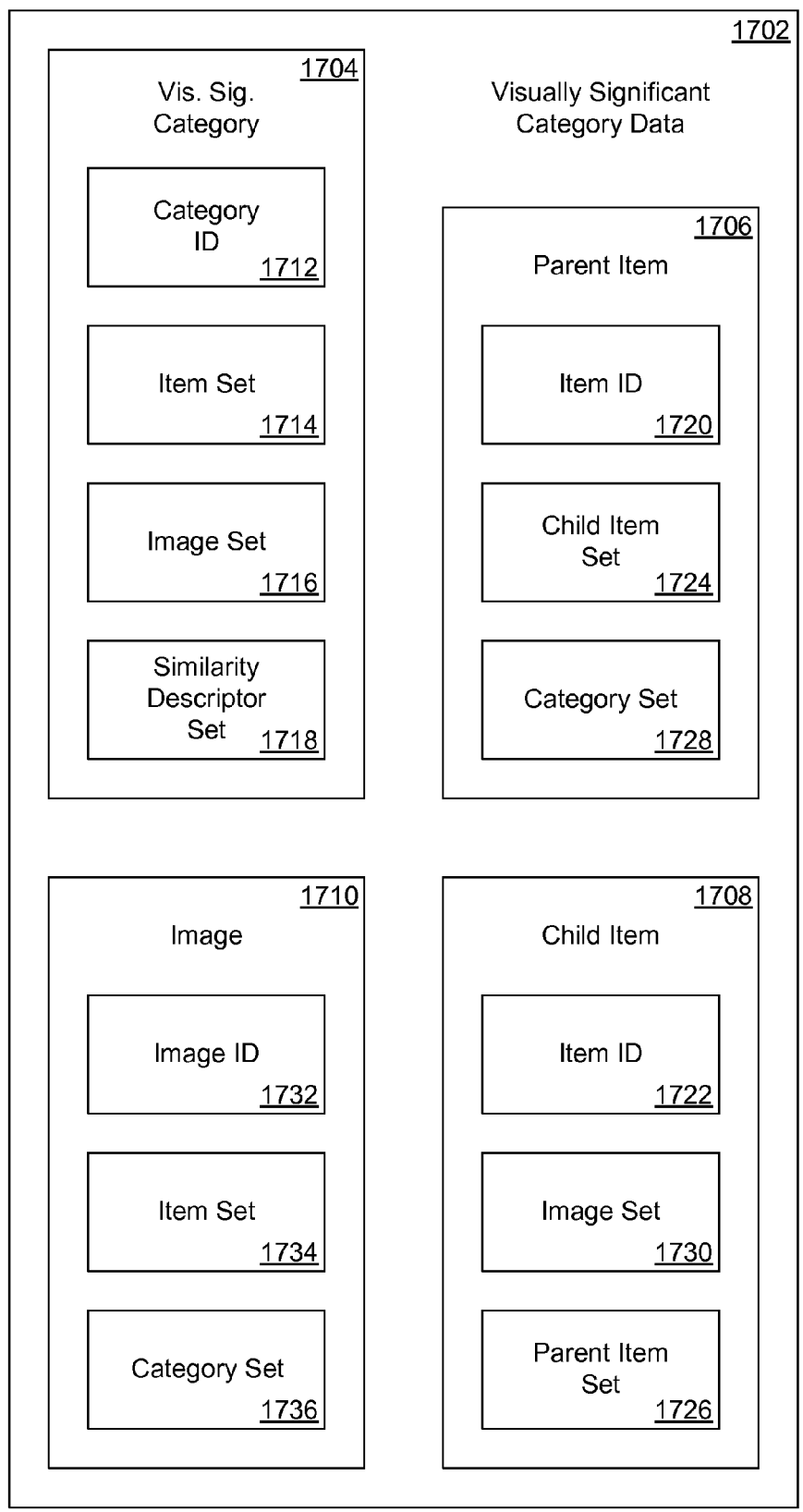
FIG. 17 is a schematic diagram depicting aspects of an example set of visually significant category data in accordance with at least one embodiment.

Visually significant categories in the category tree 250 (FIG. 2) may be referenced and/or defined by the visually significant category data 252. FIG. 17 depicts aspects of an example set of visually significant category data 1702 in accordance with at least one embodiment. The example visually significant category data 1702 includes multiple data objects each corresponding to one of a visually significant category data object 1704, a parent item data object 1706, a child item data object 1708, and an image data object 1710.

The visually significant category data object 1704 may reference and/or define a particular category of the category tree 250 (FIG. 2) as visually significant with a category identifier (ID) 1712 corresponding to the category. For example, each category in the category tree 250 may be associated with a uniquely identifying string of alphanumeric characters, and the category ID 1712 may be a copy of the uniquely identifying string of the visually significant category. The visually significant category data object 1704 may further reference an item set 1714 of content in the collection of content 206 corresponding to items that are categorized by the category having the category ID 1712. For example, each item referenced by the collection of content 206 may be associated with a uniquely identifying string of alphanumeric characters (an "item ID"), and the item set 1714 may include copies corresponding to the categorized items. The visually significant category data object 1704 may yet further reference an image set 1716 of images corresponding to items referenced by the item set 1714. For example, each image corresponding to content in the collection of content 206 corresponding to one or more items may be associated with a uniquely identifying string of alphanumeric characters (an "image ID"), and the image set 1716 may include copies corresponding to the referenced images. The visually significant category data object 1704 may still further include a similarity descriptor set 1718 including copies of similarity descriptors (e.g., histogram descriptors 210) corresponding to the images referenced by the image set 1716.

In at least one embodiment, content in the collection of content 206 (FIG. 2) corresponding to items is also arranged in an hierarchical structure. Some content may correspond to parent items having child items. For example, where items correspond to physical objects, a set of child items may correspond to physical variations of a parent item such as variations in size and/or color. Parent items may be represented in the visually significant category data 1702 with data objects corresponding to the parent item data object 1706. Child items may be represented with data objects corresponding to the child item data object 1708.

The parent item data object 1706 may reference a particular parent item with its item ID 1720. Similarly, the child item data object 1708 may reference a particular child item with its item ID 1722. The parent item data object 1706 may further reference the set of items for which the corresponding parent item is a parent with a child item set 1724 including item IDs of its child items. Similarly, the child item data object 1708 may further reference the set of items of which the corresponding child item is a child with a parent item set 1726 including item IDs of its parent items. The parent item data object 1706 may still further reference the set of categorize that categorize the corresponding parent item with a category set 1728 including the category IDs of those categories. The child item data object 1708 may still further reference a set of images associated with the corresponding child item with an image set 1730 including the image IDs of those images.

The image data object 1710 may reference a particular image with its image ID 1732. The image data object 1710 may include reference to a set of items with which it is associated (e.g., is visually representative) with an item set 1734 including the item IDs of those items. The image data object 1710 may further include reference to a set of categories that categorizes the items referenced by the item set 1734 with a category set 1736 including the category IDs of those categories. Seemingly redundant references in the visually significant category data can facilitate effective and/or efficient searching category-aware visual similarity searches, for example, by speeding navigation of the data structure. The structure of the visually significant category data 1702 corresponds to a particular trade-off between search performance (e.g., in terms of request-response latency) and "in memory" storage (i.e., storage in a limited high speed memory resource). However, alternative structures and/or trade-offs are possible. For example, additional de-normalized data objects may be added to the visually significant category data 1702 that enhance search performance at a cost of an additional "in memory" storage requirement.

Figure 18:
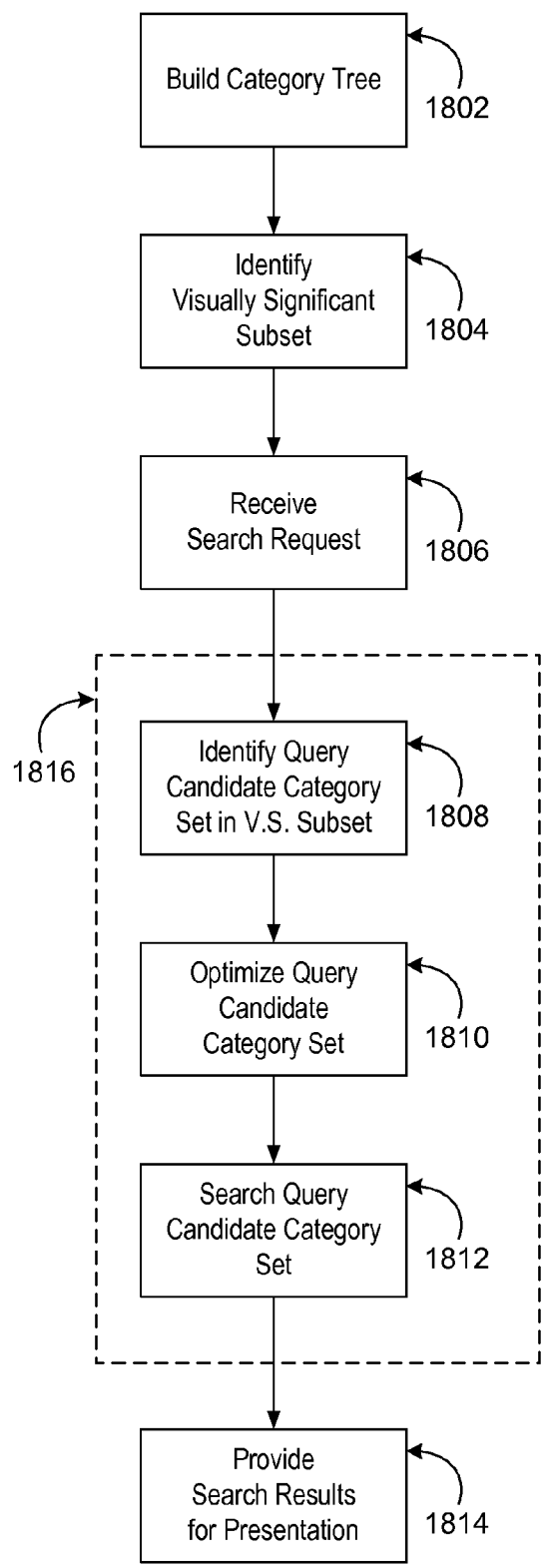
FIG. 18 is a flowchart depicting example steps for facilitating category-aware visual similarity searches in accordance with at least one embodiment.

FIG. 18 depicts example steps for facilitating category-aware visual similarity searches in accordance with at least one embodiment. At step 1802, the category tree 250 (FIG. 2) may be established and/or built. Any suitable automatic and/or manual technique may be utilized to create and/or define categories in the category tree 250, set and/or define some categories in the category tree 250 as sub-categories of other categories in the category tree 250, and/or assign content in the collection of content 206 to appropriate categories in the category tree 250. Such techniques are well known in the art, and need not be described here in detail. At step 1804, a visually significant subset of the category tree 250 (FIG. 2) may be identified. For example, visually significant category data maintenance module 254 may identify the visually significant subset of the category tree 250 at least in part by establishing and/or updating the visually significant category data 252 as described below in more detail with reference to FIG. 19 and FIG. 20.

At step 1806, a search request may be received. For example, the search module 205 (FIG. 2) may receive a search request specifying query content through the search user interface 218. At step 1808, a query candidate category set with respect to the search request may be identified from among the visually significant subset. For example, the search request of step 1806 may be associated with one or more sub-trees of the category tree 250 based at least in part on a search context of the search request such as prior navigation and/or browsing of the category tree 250. The visually significant category module 256 may identify the query candidate category set at least in part by determining an intersection of the query-associated sub-tree(s) and the visually significant subset identified at step 1804. At step 1810, the query candidate category set identified at step 1808 may be optimized. For example, the visually significant category module 256 may remove categories from the query candidate category set that have child categories in the candidate category set as described below in more detail with reference to FIG. 21.

At step 1812, the optimized query candidate category set may be searched for categorized content that is visually similar to the query content as described below in more detail with reference to FIG. 21. At step 1814, results of the search conducted at step 1812 may be provided for presentation. For example, the search module 205 (FIG. 2) may provide the search results for presentation with the search user interface 218. Steps 1808, 1810 and 1812 are surrounded by a dashed line 1816 to indicate that, in at least one embodiment, these are "query time" steps occurring after the search request is received at step 1806. This is in contrast to step 1804, which is a "build time" step in this example, occurring prior to receiving the search request. It is typically desirable to increase the amount of computational work done at build time, so as to minimize the amount of computational work done at query time and so enhance query time performance in terms of query latency, throughput and/or efficiency. However, it is not a necessity, and at least some build time work can be moved to query time, for example, to reduce storage space requirements for support data structures such as the visually significant category data 1702 (FIG. 17).

Figure 19:
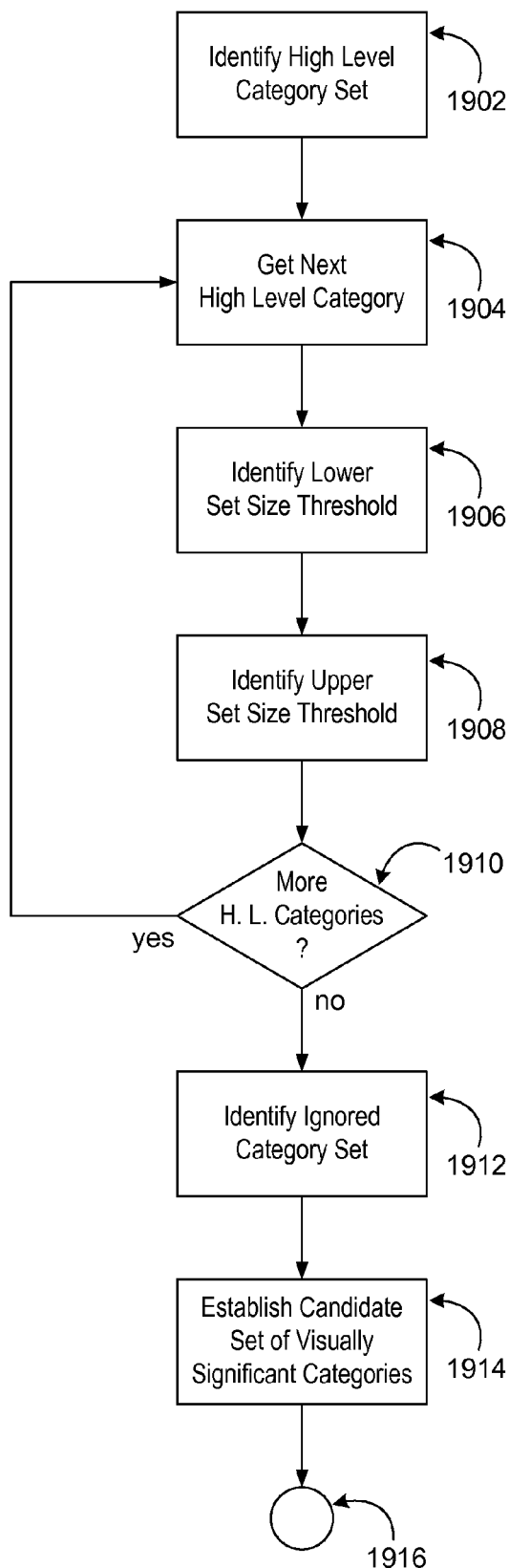
FIG. 19 is a flowchart depicting example steps for establishing and/or maintaining visually significant category data in accordance with at least one embodiment.
Figure 20:
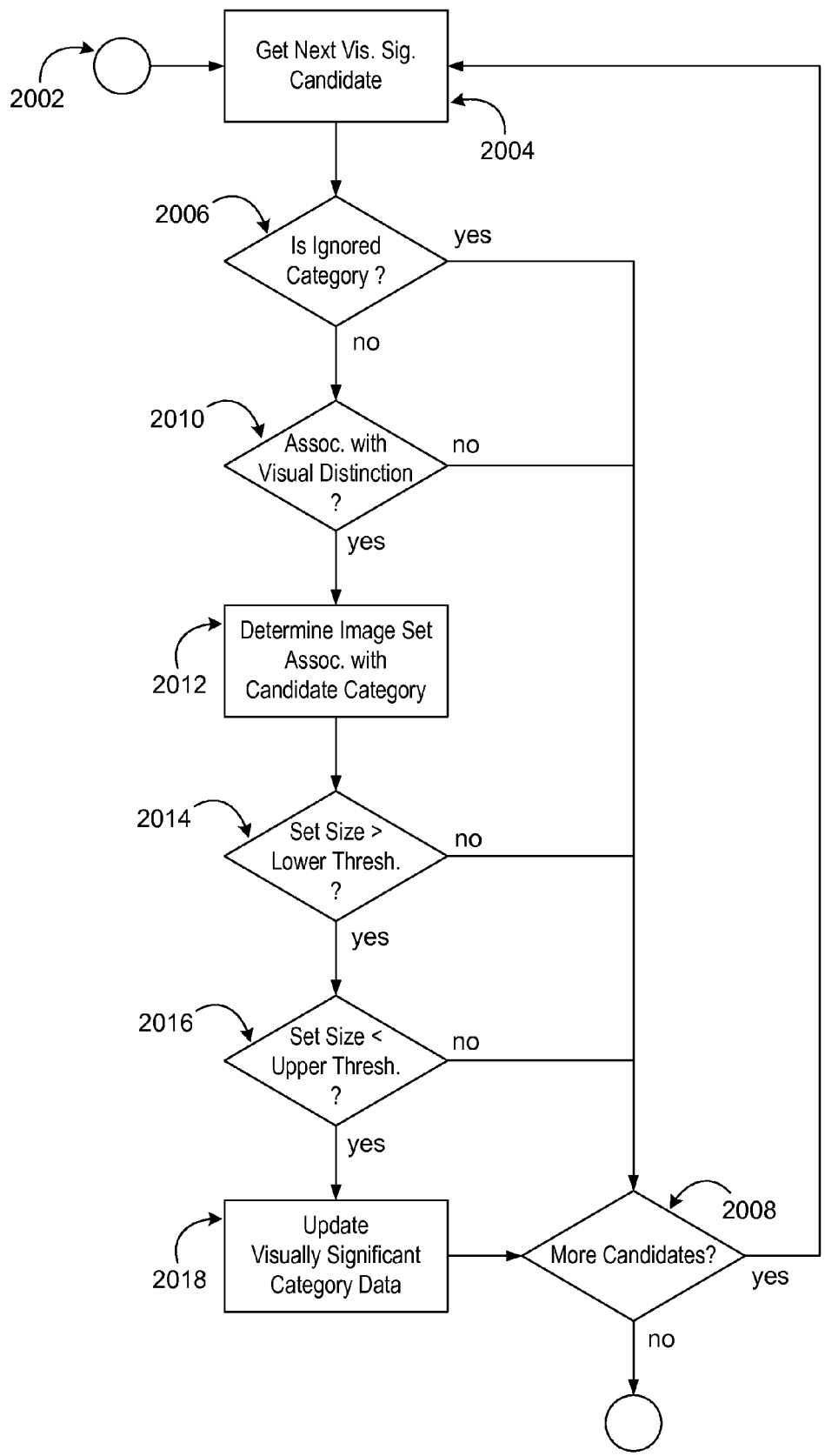
FIG. 20 is a flowchart depicting further example steps for establishing and/or maintaining visually significant category data in accordance with at least one embodiment.

At least part of the build time computational work may include establishing and/or maintaining the visually significant category data 1702 (FIG. 17). FIG. 19 and FIG. 20 depicts example steps for establishing and/or maintaining visually significant category data in accordance with at least one embodiment. At step 1902, a set of high level categories of the category tree 250 (FIG. 2) may be identified. For example, the set of high level categories may include each category in a relatively high level of the category tree 250 (e.g., corresponding to level 1604 of the category tree 1600 of FIG. 16). Alternatively, or in addition, the set of high level categories may be specified in a configuration file (e.g., with XML).

At step 1904, a next (e.g., a first) of the set of high level categories may be selected. At step 1906, a lower set size threshold may be identified for the selected category. For example, the visually significant category data maintenance module 254 (FIG. 2) may determine the lower set size threshold based at least in part on (e.g., as a linear function of) a total number of items categorized by the selected category. Alternatively, or in addition, the lower set size threshold corresponding to the selected category may be specified in the configuration file. At step 1908, an upper size threshold may be identified for the selected category. For example, the visually significant category data maintenance module 254 may determine the upper set size threshold based at least in part on (e.g., as a linear function of) a total number of items categorized by the selected category. Alternatively, or in addition, the upper set size threshold corresponding to the selected category may be specified in the configuration file. At step 1910, it may be determined whether there are more high level categories for which to identify set size thresholds. If so, a procedure incorporating step 1910 may progress to step 1904. Otherwise, the procedure may progress to step 1912.

At step 1912, an ignored category set may be identified. For example, the visually significant category data maintenance module 254 (FIG. 2) may identify a subset of the category tree 250 to be ignored for the purposes of visual similarity searches. The visually significant category data maintenance module 254 may identify the ignored category set based at least in part on one or more attributes of categories in the category tree 250. For example, where the categories of the category tree 250 categorize content in the collection of content 206 corresponding to items of apparel such as shoes, the categories may have an attribute characterizing them as corresponding to a wearable dimension of the item of apparel (e.g., size) or a non-wearable dimension (e.g., color), and the visually significant category data maintenance module 254 may identify the categories corresponding to wearable dimensions as part of the ignored category set. Alternatively, or in addition, categories in the category tree 250 that are to be added to the ignored category set may be specified explicitly (e.g., with an "ignore for purposes of visual similarity" attribute) and/or in the configuration file.

At step 1914, a candidate set of visually significant categories may be established. For example, the visually significant category data maintenance module 254 (FIG. 2) may add each category in a sub-tree of the category tree 250 that is rooted at one or more of the categories in the high level category set identified at step 1902 to the candidate set of visually significant categories. The circle 1916 of FIG. 19 is a diagrammatic connector corresponding to the circle 2002 of FIG. 20.

At step 2004, a next (e.g., a first) category in the candidate set of visually significant categories established at step 1914 (FIG. 19) may be selected. At step 2006, it may be determined whether the selected category is in the ignored category set identified at step 1912. If so, a procedure incorporating step 2006 may progress to step 2008. Otherwise, the procedure may progress to step 2010.

At step 2010, it may be determined whether the selected category is associated with a visual distinction. For example, the visually significant category data maintenance module 254 (FIG. 2) may determine whether the selected category is associated with a visual distinction based at least in part on one or more attributes of the selected category (e.g., an "is visually distinctive" attribute). Alternatively, step 2010 may be omitted so that each category in the candidate set of visually significant categories that is not also in the ignored category set is assumed to be associated with a visual distinction.

At step 2012, an image set associated with the selected category may be determined. For example, the visually significant category data maintenance module 254 (FIG. 2) may determine a set of images associated with content in the collection of content 206 corresponding to items that are categorized by the selected category. At step 2014, it may be determined whether a size of the image set (e.g., the number of images in the image set) is greater than the lower set size threshold identified for the selected category at step 1906 (FIG. 19). If so, the procedure may progress to step 2014. Otherwise, the procedure may progress to step 2008. At step 2016, it may be determined whether the size of the image set is less than the upper set size threshold identified for the selected category at step 1908. If so, the procedure may progress to step 2018. Otherwise, the procedure may progress to step 2008.

At step 2018, the visually significant category data 252 (FIG. 2) may be updated with respect to the selected category.

For example, the visually significant category data maintenance module 254 may create a visually significant category data object 1704 (FIG. 17) corresponding to the selected category, as well as creating and/or updating parent item data objects 1706, child item data objects 1708 and/or image data objects 1710 referenced by the visually significant category data object 1704 corresponding to the selected category. The selected category may, at least in part, be thereby designated as visually significant. At step 2008, it may be determined whether there are further categories in the candidate set of visually significant categories to consider. If so, the procedure may progress to step 2004. Otherwise, the procedure may progress to one or more steps not shown in FIG. 20 such as step 1806 of FIG. 18. In at least one embodiment, categories identified as visually significant with steps of FIG. 19 and/or FIG. 20 correspond to visually coherent sets of content in the collection of content 206.

Figure 21:
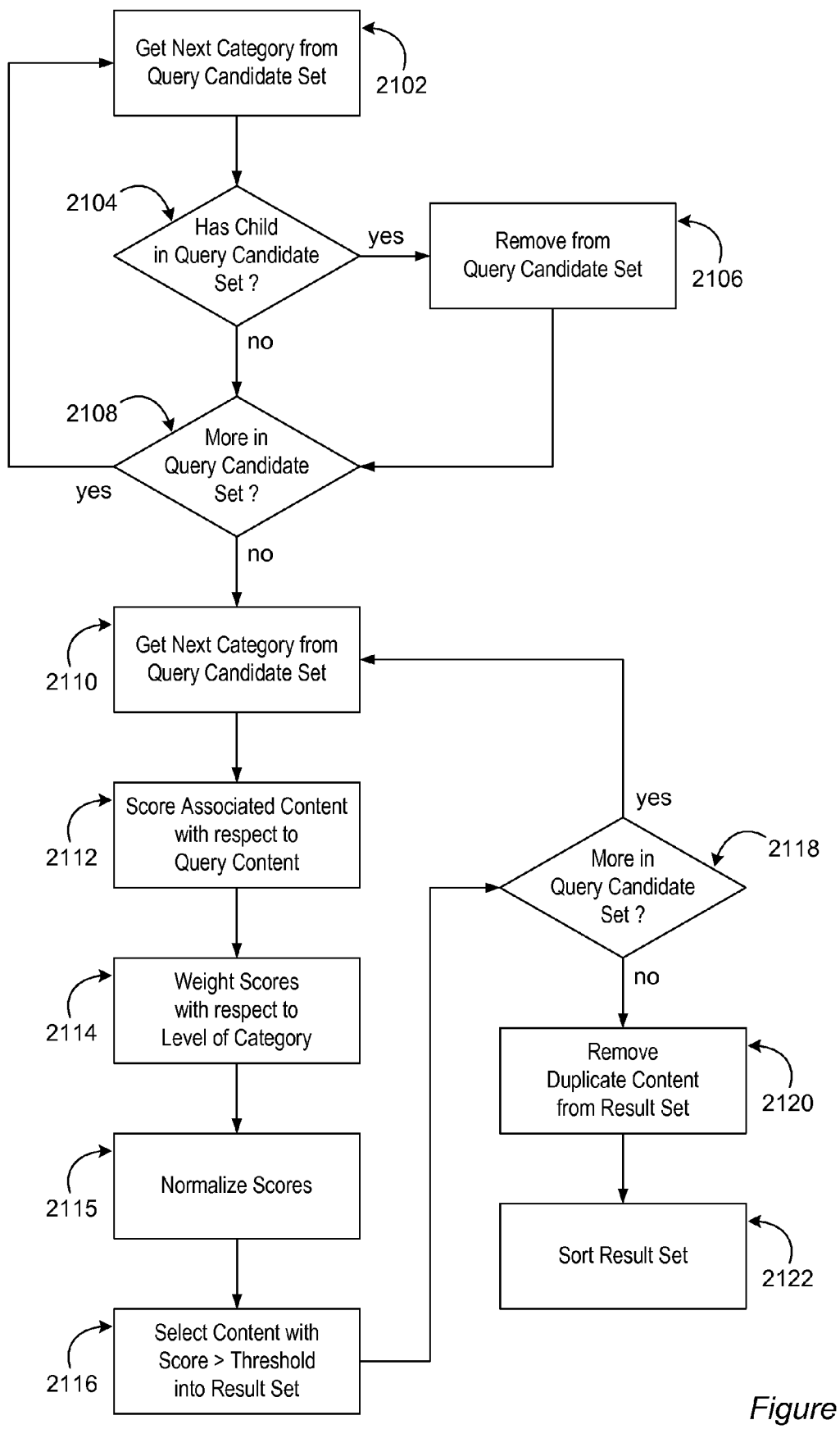
FIG. 21 is a flowchart depicting example steps for optimizing and/or searching a query candidate set of visually significant categories in accordance with at least one embodiment.

FIG. 21 depicts example steps for optimizing and/or searching a query candidate set of visually significant categories in accordance with at least one embodiment. At step 2102, a next (e.g., a first) category from the query candidate set may be selected. For example, the visually significant category module 256 (FIG. 2) may select the next category from the query candidate category set identified at step 1808 (FIG. 18). At step 2104, it may be determined whether the selected category has a child category that is in the query candidate set. If so, a procedure incorporating step 2104 may progress to step 2106. Otherwise, the procedure may progress to step 2108. At step 2106, the selected category may be removed from the query candidate set, for example, by the visually significant category module 256. At step 2108, it may be determined whether there are more categories in the query candidate set to consider for removal. If so, the procedure may progress to step 2102. Otherwise, the procedure may progress to step 2110.

At step 2110, a next (e.g., a first) category from the (optimized) query candidate set may be selected. At step 2112, content categorized by the selected category may be scored with respect to a visual similarity with the query content. For example, the search module 205 (FIG. 2) may determine the visual similarity scores based at least in part on distances (e.g., in the descriptor space) between descriptors in the similarity descriptor set 1702 (FIG. 17) associated with the selected category and one or more similarity descriptors associated with the query content. At step 2114, the scores determined at step 2112 may be weighted with respect to a level of the selected category in the category tree 250. For example, the visually significant category module 256 may give higher weight to scores associated with categories that are lower in the category tree 250 with a suitable weighting function. Examples of suitable weighting functions include linear and non-linear weighting functions with respect to category level. At step 2115, the weighted scores of step 2114 may be normalized to facilitate inter-category comparability. For example, the visually significant category module 256 may normalize the weighted scores based at least in part on the selected category and/or a statistical distribution of the weighted scores therein. The set size thresholds described above with reference to FIG. 19 may be set to facilitate one or more properties of the normalization such as a statistical validity and/or robustness.

At step 2116, content having a visual similarity score above a threshold may be selected into a search result set. For example, the search module 205 (FIG. 2) may establish and/or update the search result set with the high scoring content, or a reference thereto. The threshold may have a fixed value. Alternatively, the threshold may have a value based at least in part on the selected category and/or the level of the selected category in the category tree 250. For example, the threshold may be set such that content of the selected category is sufficiently represented and/or not overly represented in the search result set. In at least one embodiment, the visual similarity score may furthermore be a set and/or vector of score components, and the threshold may be a comparable set and/or vector of threshold components. For example, the score and threshold components may correspond to local-texture, global-shape and/or local-shape aspects of visual similarity.

At step 2118, it may be determined whether there are further categories in the query candidate set to be searched. If so, the procedure may progress to step 2110. Otherwise, the procedure may progress to step 2120. As will be apparent to one of skill in the art, where multiple physical servers capable of determining visual similarity scores are available, step 2112, and optionally steps 2114 and 2116, may be performed simultaneously in parallel with respect to multiple categories selected from the query candidate set. Since same content may be categorized by multiple categories, the search result set of step 2116 may include duplicate content and/or references thereto. At step 2120, duplicate content may be removed from the search result set. For example, where content in the search result set corresponds to images, the visually significant category module 256 (FIG. 2) may remove duplicate images based at least in part on image ID 1732 (FIG. 17).

At step 2122, the search result set may be sorted by visual similarity score, for example, so that an initial portion of the search result set contains the highest scoring content with respect to visual similarity. In at least one embodiment, the sort of step 2122 may be a multi-stage and/or category-aware sort. For example, search results in subsets of the search result set that correspond to categories may be sorted independently, and then a sort order may be determined for the subsets based at least in part on a relevance of the corresponding category. Per category aspects of such sorting may be incorporated into the procedural "loop" formed by steps 2110-2118. The search results in the search result set may be grouped by category.

With reference to FIGS. 2 and 22-29 systems and methods are provided for, among other things, defining refinement shapes, organizing the refinement shapes into a refinement-shape hierarchy, and associating inventory items to refinement shapes of the refinement-shape hierarchy in accordance with at least one embodiment. Further, with reference to FIGS. 2 and 22-29, systems and methods are provided for enabling visual-based searching of the refinement-shape hierarchy for inventory items having shapes similar to query refinement shapes in accordance with at least one embodiment. For example, responsive to a search query that references a particular refinement shape, systems and methods are provided for providing at least a reference to inventory items that are associated with the query refinement shape.

Figure 22:
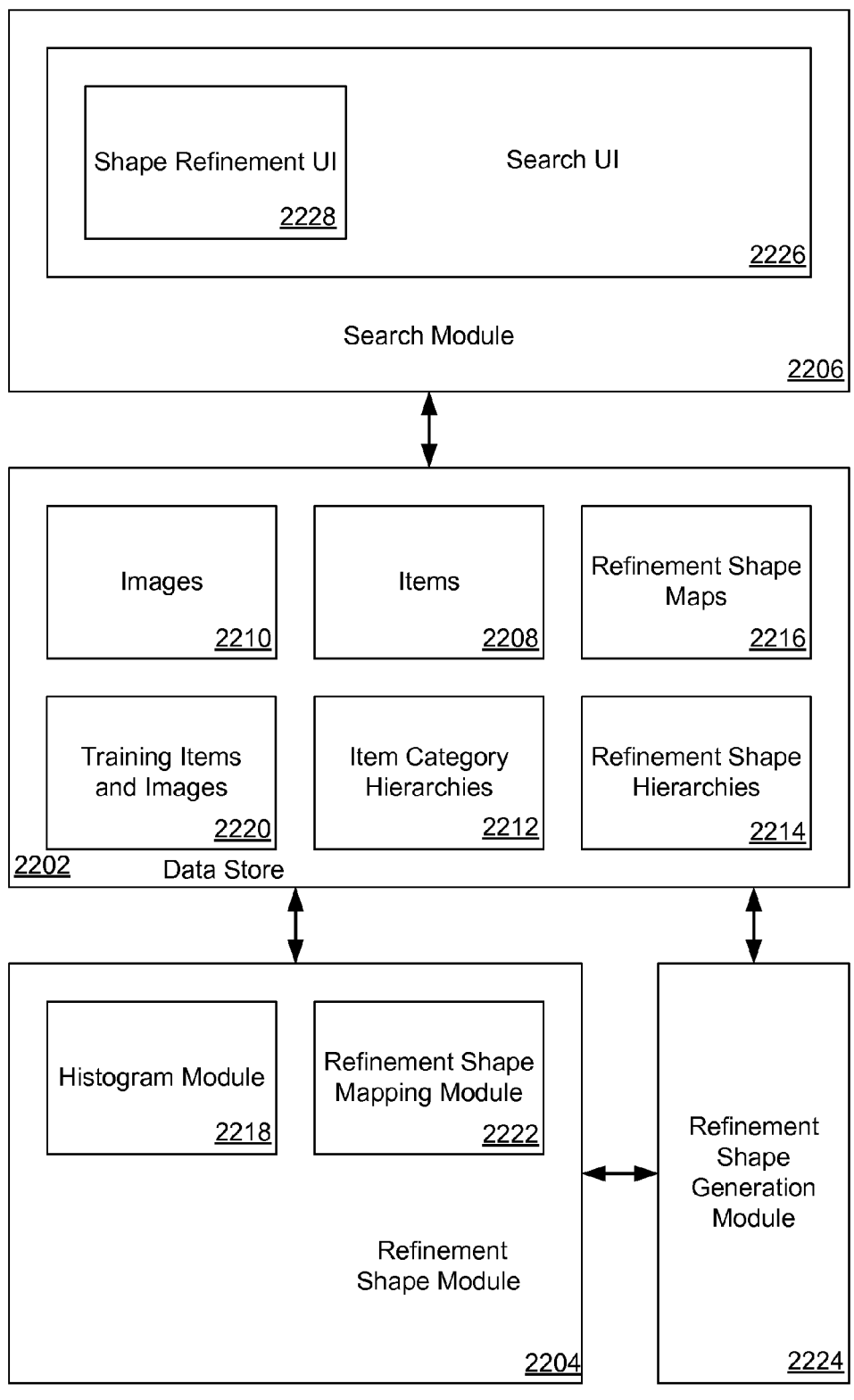
FIG. 22 is a schematic diagram depicting aspects of an example computerized system in accordance with at least one embodiment.

It will be helpful to have reference to an example system configured to facilitate searching with refinement shapes in accordance with at least one embodiment. FIG. 22 depicts salient aspects of an example system 2200 in accordance with at least one embodiment. The system 2200 may include a data store 2202 updated by a refinement shape module 2204 and/or a refinement shape generation module 2224 and utilized by a search module 2206. According to some embodiments, the system 2200 may be incorporated into and/or be implemented by the system 200 of FIG. 2 and/or the system 100 of FIG. 1. For example, the data store 2202 may be incorporated into and/or be implemented by the data store 110 of FIG. 1, the refinement shape module 2204 and/or the refinement shape generation module 2224 may be incorporated into and/or be implemented by the development server 120 and/or the application server 108, and the search module 2206 may be incorporated into and/or be implemented by the application server 108 and/or the web server 106. The arrows shown in FIG. 22 between the data store 2202 and the refinement shape, refinement shape generation and search modules 2204, 2224, 2206 indicate that the data store 2202 and the refinement shape, refinement shape generation and search modules 2204, 2224, 2206 are communicatively coupled, for example, by a network.

The data store 2202 may store a collection of inventory items 2208 and a collection of images 2210. At least some of the items 2208 may be associated with one or more of the images 2210. The data store 2202 may further store one or more item category hierarchies 2212 each categorizing the items 2208 into a plurality of item categories. Still further, the data store 2202 may store one or more refinement shape hierarchies 2214 and one or more refinement shape maps and/or mappings ("maps") 2216. The refinement shape maps 2216 may correspond to data associating items to representative refinement shapes in the refinement shape hierarchies 2214.

The refinement shape module 2204 may include an histogram module 2218 for analyzing the images 2210 associated with the items 2208. Further, the refinement shape module 2204 may include a refinement shape mapping module 2222 capable of, for example, updating the refinement shape maps 2216 based at least in part on data provided by the histogram module 2218. The refinement shape generation module 2224 may generate one or more of the refinement shape hierarchies 2214.

The search module 2206 may facilitate shape-based searching of the items 2208 in the data store 2202. The search module 2206 may include a search user interface (UI) module 2226 facilitating user interaction with the search module 2206. The search UI module 2226 may include a refinement shape user interface (UI) module 2228 that facilitates refinement shape related aspects of a search user interface. An example search user interface in accordance with at least one embodiment is described below with reference to FIGS. 24-27.

As described below with reference to FIG. 2, the collection of items 2208 may include any suitable items. Examples of suitable items include electronic records of physical and virtual objects including documents, electronic documents and commercial objects corresponding to goods and/or services, references thereto including reference by uniform resource locator (URL), and suitable combinations thereof. Unless otherwise indicated, or made clear by context, the term "item" as used herein may refer to an item itself, an electronic record associated with the item and/or a reference to the item.

Further, as mentioned below with reference to FIG. 2, the collection of images 2210 may include any suitable image in any suitable image format. Examples of suitable images include images of physical and virtual objects including documents, electronic documents and commercial objects corresponding to goods and/or services. Examples of suitable image formats include electronic image formats such as digital image formats including raster formats such as bitmaps (e.g., BMP), compressed images in accordance with a Joint Photographic Experts Group (JPEG) standard, graphics interchange formats (e.g., GIF), and portable network graphics formats (e.g., PNG), as well as rasterizable vector formats such as computer graphics metafile formats (e.g., CGM) and scalable vector graphics formats (e.g., SVG).

The images 2210 associated with the items 2208 may be representative of the items 2208, for example, graphical presentations of the items 2208 and/or digital photographs of the items 2208. The images 2210 may be in accordance with an item imaging specification. For example, the item imaging specification may specify that an image in the collection of images 2210 should be representative of no more than one item in the collection of items 2208, that the item occupy a particular proportion of a rendering of the image (e.g., greater than two thirds), that a background of the image be a particular color (e.g., a shade of white found rarely in nature), and/or, where applicable, that the image be captured under particular lighting conditions (e.g., lighting conditions similar to bright daylight).

The item category hierarchies 2212 may include any suitable item category. Examples of suitable item categories include categories corresponding to item type, item purpose, item use and item location, categories corresponding to users, owners and/or consumers of items, and suitable combinations thereof. Particular item categories in the item category hierarchies 2212 may have one or more parent categories and/or one or more child categories. Root categories of the item category hierarchies 2212 may have no parent categories. Leaf categories may have no child categories. An item category may be considered include items categorized into one of its child categories. Items categories may be associated with a particular level in an item category hierarchy. For example, the level of a particular item category may correspond to a path length in the item category hierarchy from the item category to a root category. The item category hierarchy may include an all-items root category, which may be associated with a level zero in the item category hierarchy.

Each of the refinement shape hierarchies 2214 may include a plurality of refinement shapes arranged in a hierarchical structure having a plurality of levels. However, each embodiment need not be so limited. For example, in at least one embodiment the refinement shape hierarchies 2214 may include one or more refinement shape hierarchies having a single level. An example refinement shape hierarchy is described below in more detail with reference to FIG. 23. For clarity, the example system 2200 shows the refinement shape maps 2216 associating ones of the items 2208 to refinement shapes in the refinement shape hierarchies 2214 as distinct entities in the data store 2202. However, in at least one embodiment, the refinement shape maps 2216 and/or data corresponding thereto may be incorporated into other entities stored by the data store 2202, for example, the items 2208, the item category hierarchies 2212 and/or the refinement shape hierarchies 2214.

The histogram module 2218 may analyze the images 2210 to produce histograms of the images 2210. For example, the histogram module 2218 may calculate histograms of the images 2210 according to the processes described with reference to FIGS. 4-13. Such histograms may include local-texture, global shape, local-shape, and contour histograms, for example. The refinement shape mapping module 2222 may map an item to a representative set of refinement shapes in the refinement shape hierarchies 214 based at least in part on the histograms of the item as determined by the histogram module 2218. The refinement shape mapping module 2222 may also determine representative confidences of refinement shapes for ones of the items 2208.

The refinement shape hierarchies 2214 may be specified manually. Alternatively, or in addition, at least some of the refinement shape hierarchies 2214 may be automatically generated, at least in part. The refinement shape generation module 2224 may facilitate automated refinement shape hierarchy generation at least in part by utilizing histograms of items generated by the histogram module 2218. For example, the refinement shape generation module 224 may aggregate the histograms for the collection of items 2208 and cluster the aggregate at various granularities. A refinement shape may be chosen from a cluster center as representative of refinement shapes in the cluster. Levels of a refinement shape hierarchy may correspond to aggregate clusterings of increasingly fine granularity. Connections between levels of the refinement shape hierarchy may correspond to overlaps by clusters from aggregate clusterings of different granularity. Cluster granularity may be varied between levels of the refinement shape hierarchy so that refinement shapes in the refinement shape hierarchy have less than a threshold number of child refinement shape.

The search UI module 2226 may provide information from the search module 2206 for presentation. For example, the search UI module 2226 may generate a search user interface (UI) presentation specification and provide the specification to the client device 102 (FIG. 1) through the network 104. The search UI module 2226 may specify the search UI presentation with any suitable presentation specification language including suitable hypertext markup languages (e.g., HTML) and suitable programming and/or scripting languages (e.g., JavaScript). An example search UI presentation is described below with reference to FIGS. 24-27. The search UI module 2226 may receive information responsive to the search UI presentation. For example, the search UI module 2226 may receive search requests and/or refinements from the client device 102. The search UI module 2226 may process received requests and activate associated search module 2206 functionality in response. For example, the search UI module 2226 may identify a search specification including search terms in a search request, invoke search module 2206 functionality to generate a search result including a search result set for the search terms, and/or processing any suitable search attribute.

The refinement shape UI module 2228 may provide one or more of the refinement shape hierarchies 2214, or portions thereof, for presentation. For example, the refinement shape UI module 2228 may participate in generation of the search UI presentation by the search UI module 2226. In particular, the refinement shape UI module 2228 may specify refinement shape related aspects of the search UI presentation. Refinement shape hierarchy presentations specified by the refinement shape may be interactive. For example, in a particular refinement shape hierarchy presentation, a first portion of a particular refinement shape hierarchy may be visible and, responsive to user interaction with the first portion, a second portion of the refinement shape hierarchy may be made visible. The refinement shape UI module 2228 may parse, interpret and/or respond to refinement shape related information contained in messages and/or requests received, for example, from the client device 102 (FIG. 1). For example, the refinement shape UI module 2228 may instruct the search module 2206 to update a search result set based at least in part on a refinement shape selection.

Figure 23:
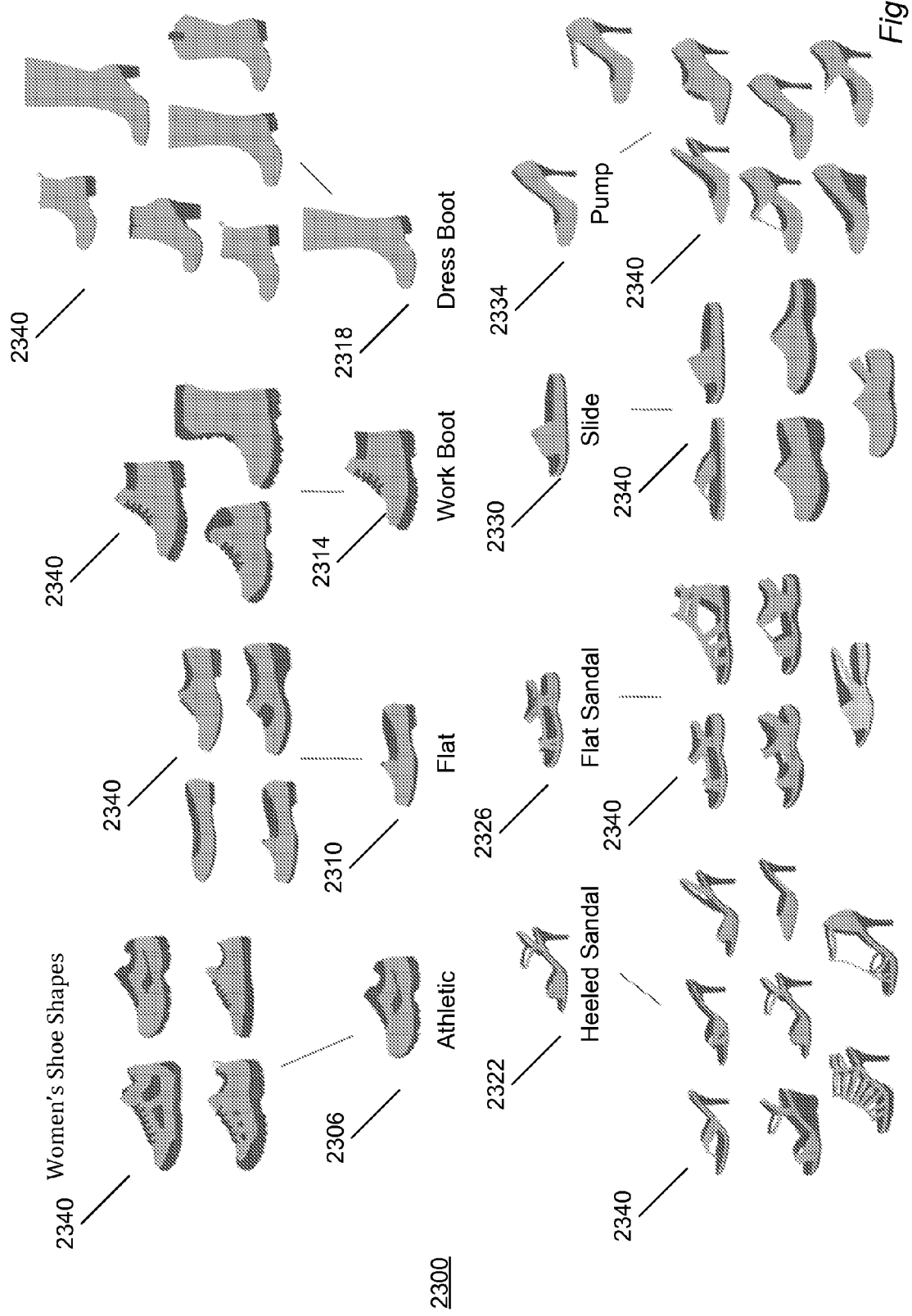
FIG. 23 is a schematic diagram depicting aspects of a refinement-shape hierarchy accordance with at least one embodiment.
Figure 24:
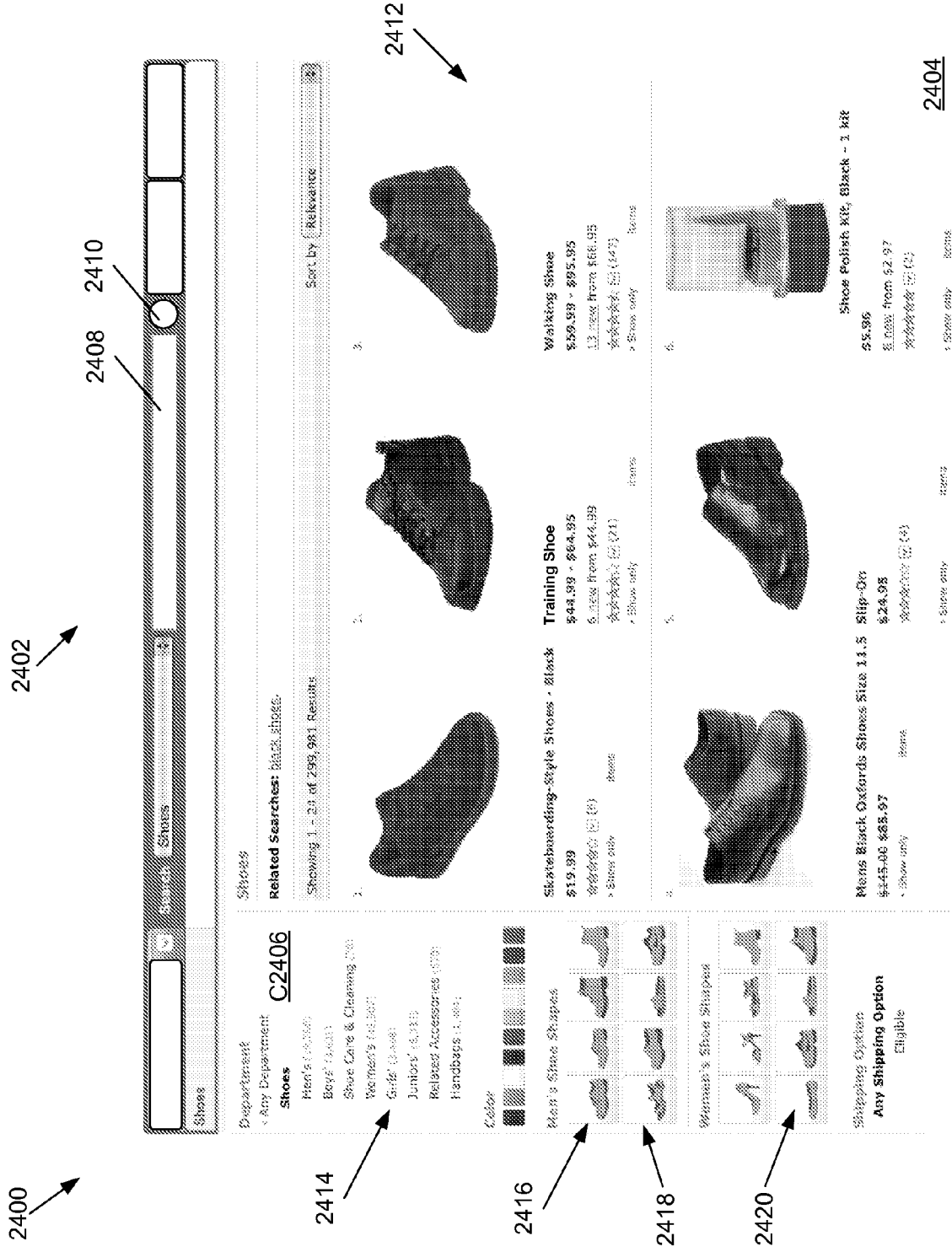
FIG. 24 is a schematic diagram depicting aspects of an example user interface in accordance with at least one embodiment.

It will be helpful to have reference to an example refinement shape hierarchy in accordance with at least one embodiment. FIG. 23 depicts aspects of an example refinement shape hierarchy 2300 in accordance with at least one embodiment. The refinement shape hierarchy 2300 was created around refinement shapes for a set of women's shoes. For example, the illustrated refinement shape hierarchy 2300 includes athletic refinement shape 2306, flat refinement shape 2310, work boot refinement shape 2314, dress boot refinement shape 2318, heeled sandal refinement shape 2322, flat sandal refinement shape 2326, slide refinement shape 2330, and pump refinement shape 2334. Of course, refinement shape hierarchies in accordance with at least one embodiment may include additional, fewer, and/or alternative refinement shapes. These refinement shapes 2306, 2310, 2314, 2318, 2322, 2326, 2330, 2334 may be child nodes of a "women's shoes" node, which may be a child node of a "shoes" node in the refinement shape hierarchy 2300. The refinement shapes 2306, 2310, 2314, 2318, 2322, 2326, 2330, 2334 may be understood as residing at a first level of the refinement shape hierarchy 2300. The refinement shapes 2306, 2310, 2314, 2318, 2322, 2326, 2330, 2334 may correspond to a clustering of the items 208 (FIG. 2) at a first granularity.

The refinement shape hierarchy 2300 may further include refinement shapes 2340. These refinement shapes 2340 may be understood as residing at a second level of the refinement shape hierarchy 2300. The refinement shapes 2340 may correspond to a clustering of the items 2208 (FIG. 22) at a second granularity finer than the first granularity. The refinement shape hierarchy 2300 may include further refinement shapes not shown in FIG. 23. In particular, the refinement shape hierarchy 2300 may include further refinement shapes at the second level, as well as at any suitable number of subsequent levels. Refinement shapes at lower levels may be understood as being beneath refinement shapes at higher levels.

In the refinement shape hierarchy 2300, the refinement shapes 2340 are child nodes of the refinement shapes 2306, 2310, 2314, 2318, 2322, 2326, 2330, 2334. The refinement shapes 2340 may correspond to regions of the descriptor space in the histograms of the items 2208 (FIG. 22). The refinement shapes 2340 at the second level of the refinement shape hierarchy 2300 may correspond to regions of the descriptor space that overlap regions of the descriptor space to which the refinement shapes 2306, 2310, 2314, 2318, 2322, 2326, 2330, 2334 at the first level of the refinement shape hierarchy 2300 correspond.

The refinement shape hierarchy 2300 is an example of one of the refinement shape hierarchies 2214 of FIG. 22. The refinement shape hierarchy 2300, or portions thereof, may be presented, for example, to a user of the system 2200 in a user interface facilitated by the refinement shape UI module 2228. FIGS. 24-27 depict aspects of an example user interface in accordance with at least one embodiment.

The user interface 2400 of FIGS. 24-27 may include graphical user interface (GUI) components such as a search input component 2402, a search result component 2404 and a search navigation component 2406. However, each embodiment need not be so limited. The user interface 2400 may incorporate any suitable user interface (UI) component. Examples of suitable user interface components include, but are not limited to, components configured to cause, monitor, alter and/or suppress a human perception and/or a human sensory event including visual perceptions, auditory perceptions, tactile perceptions and kinesthetic perceptions. For example, the user interface 2400 may be presented to the user by the client device 102 of FIG. 1.

The search input component 2402 may include a text input component 2408 and a search submission component 2410. The search result component 2404 may include a plurality of search result presentations such as the search result presentation 2412. The search navigation component 2406 may include an item categories presentation 2414 and a refinement shape hierarchy presentation 2416. The search input component 2402, the search result component 2404, and the search navigation component 2406 may be visually differentiated, for example, by a displayed location, a visual grouping and/or one or more explicit elements of visual separation and/or differentiation. In the example user interface 2400, visual presentation areas associated with the search input component 2402, the search result component 2404 and the search navigation component 2406 are contiguous. However, each embodiment need not be so limited. For example, aspects of the item categories presentation 2414 may be incorporated into the visual presentation area associated with the search result component 2404.

The user of the user interface 2400 may input text with the text input component 2408. The text input may be any suitable text. Example of suitable text include one or more strings of alphanumeric characters, one or more strings of symbols such as symbols corresponding to keys of a keyboard, words of a language such as English, and suitable combinations thereof. The text input may correspond to one or more search terms. The search submission component 2410 may be selected, for example, to submit the text to the search module 2206 of FIG. 22.

The search results presented by the search result component 2404 may correspond to one or more search terms input with the text input component 2408. For example, the presented search results may be a presentation of a portion of a search result set provided by the search module 2206 (FIG. 22) responsive to the submitted search terms. Each presented search result may correspond to an item such as one of the items 2208. For example, the search result presentation 2412 may include a name of the item (item name), one or more attributes of the item (item attributes), an image for the item (image) and a description of the item (item description). The image for the item may be selected from among the one or more of the images 2210 associated with the item. FIGS. 24-27 depict each of the search results presented by the search result component 2404 as having a similar presentation format. However, each embodiment need not be so limited.

The name of the item may be any suitable item identifier. For example, the name may include one or more strings of symbols such as alphanumeric characters and/or words of a language such as a natural language. Presented attributes of the item may be selected from a suitable set of item attributes. Suitability of a particular attribute for presentation may depend on a type of the item, a context of the search, a purpose of the user interface 2400 and/or a theme of the user interface 2400. For example, the item may be a representation of an electronic document, and suitable item attributes may include one or more authors, a publication date, one or more document statistics including document size, and one or more document location specifications such as uniform resource locators (URLs). As another example, the search may have a commercial context, and suitable item attributes may include one or more availability specifications including a number of items in stock and one or more dates and/or date ranges, one or more quality specifications, one or more prices and/or price components including base price, taxes and delivery costs, one or more popularity scores, and one or more consumer review ratings. The description of the item may include any suitable text including hypertext.

The item categories presentation 2414 may present, for example, a portion of one of the item category hierarchies 2212 of FIG. 22. The item categories presentation 2414 may indicate one or more categories explicitly associated with the search that resulted in the search result set at least partially presented by the search result component 2404. The item categories presentation 2414 may be interactive. For example, user selection of one or more of the categories presented by the item categories presentation 2414 may restrict the search result set to include items in the selected categories.

The refinement shape hierarchy presentation 2416 may present, for example, a portion of one or more of the refinement shape hierarchies 2214 of FIG. 22. The refinement shape hierarchy to be presented may be selected from the refinement shape hierarchies 2214 by the refinement shape UI module 2228. The refinement shape UI module 2228 may select the refinement shape hierarchy to be presented based at least in part on one or more attributes of the search and/or the user conducting the search including the search result set at least partially presented by the search result component 2404, the one or more item categories explicitly associated with the search, one or more temporal and/or geo-temporal parameters including local time of day, day of week, season, traditional event, special event, social event, and/or suitable combinations thereof.

The refinement shape hierarchy presentation 2416 may be interactive. In particular, the refinement shape hierarchy presentation 2416 may initially present a first portion of the selected refinement shape hierarchy, and may present second and subsequent portions responsive to user interaction. Selection of one or more refinement shapes in the refinement shape hierarchy presentation 2416 may modify the search result set at least partially presented by the search result component 2404. For example, the search result set may be refined to include at least references those items 2208 (FIG. 22) for which the selected one or more refinement shapes are representative. Alternatively, or in addition, the search result set may be re-ordered to rank higher (e.g., in presentation order) those items for which the selected one or more refinement shapes are representative.

Portions of the illustrated refinement shape hierarchy presentation 2416 may be a presentation of the example refinement shape hierarchy 2300 of FIG. 23. For example, the refinement shape hierarchy presentation 2416 of FIG. 24 may include two sets of icons 2418 and 2420 that respectively represent parent refinement shapes for men's shoe shapes and parent refinement shapes for women's shoe shapes. The set of icons 2420 that represents parent refinement shapes for women's shoes shapes may include a plurality of refinement shapes such as athletic refinement shape, flat refinement shape, work boot refinement shape, dress boot refinement shape, heeled sandal refinement shape, flat sandal refinement shape, slide refinement shape, and pump refinement shape. These refinement shapes represented by icons 2420 may correspond to respective athletic refinement shape 2306, flat refinement shape 2310, work boot refinement shape 2314, dress boot refinement shape 2318, heeled sandal refinement shape 2322, flat sandal refinement shape 2326, slide refinement shape 2330, and pump refinement shape 2334 of the refinement shape hierarchy 2300 of FIG. 23.

The refinement shape hierarchy presentation 2416 may limit a number of visible refinement shape presentations to less than a threshold. For example, the visible refinement shape presentations threshold may correspond to an optimal number (e.g., empirically determined) with respect to one or more search goals such as minimizing abandoned searches, maximizing user interaction with item presentations, maximizing one or more particular types of user interaction with item presentations such as viewing item details, commercial goals including sales, and/or suitable combinations thereof. The visible refinement shape presentations threshold may vary, for example, by refinement shape type and/or item category.

The refinement shape hierarchy presentation 2416 may be interactive. One or more of the icons of the sets of refinement shape icons 2418 and 2420 may be selectable. In addition, interaction with (e.g., moving a mouse pointer over) the icons of the sets of refinement shape icons 2418 and 2420 may cause the second level of the refinement shape hierarchy 2300

Figure 25:
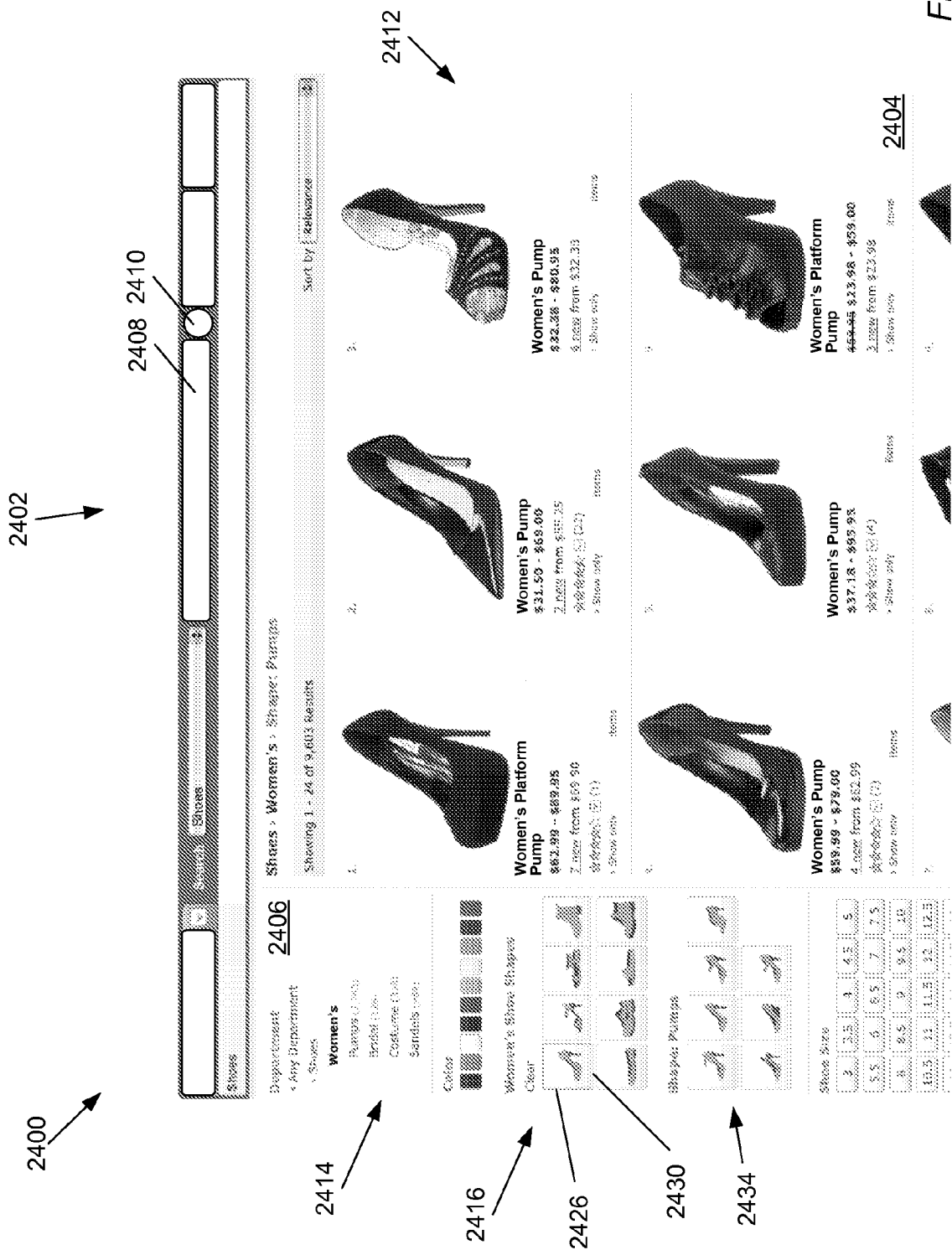
FIG. 25 is a schematic diagram depicting aspects of an example user interface in accordance with at least one embodiment.

(FIG. 23) to be presented. Refinement shape icons may be emphasized after they are selected. For example, as depicted in FIG. 25, icon 2426, which represents women's high heeled pumps, is illustrated as being visually emphasized with a distinctive attention indicator 2430, which encloses the icon 2426. Icons may be emphasized based at least in part on a user selecting the icon to refine the search result set that is at least partially presented by the search result component 2404. As indicated at 2434, if a user selects icon 2426, which represents women's high heeled pumps, then the refinement shape hierarchy presentation 2416 presents icons that represent relevant child refinement shapes at 2434. According to the illustrated embodiment, the icons presented at 2434 correspond to the refinement shapes 2340, which reside at a second level of the refinement shape hierarchy 2300 of FIG. 23 and are child shapes for women's high heeled pumps 2334. Further, if a user selects icon 2426, the results presented in the search result presentation 2412 are restricted to women's high heel pumps.

Figure 26:
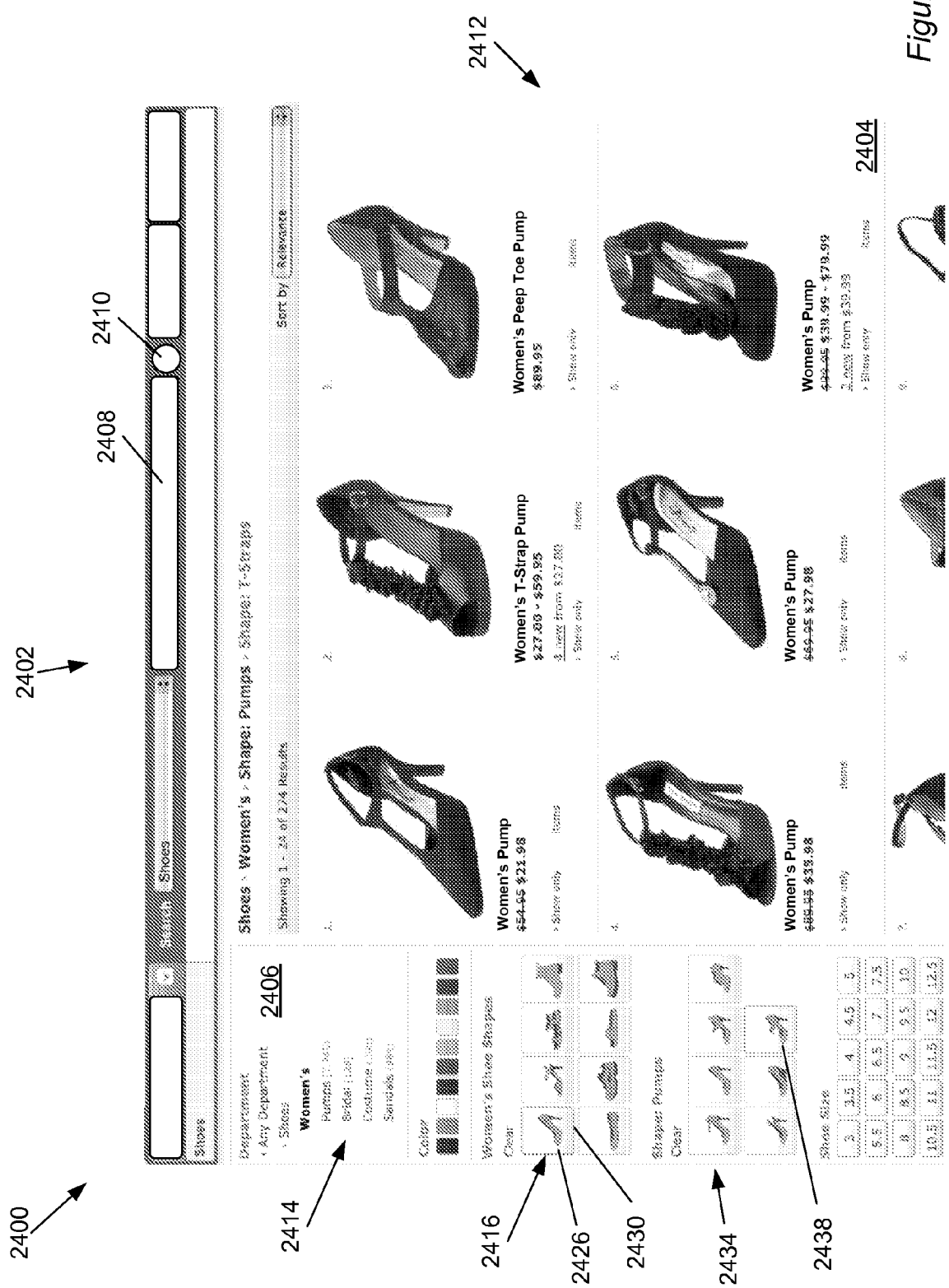
FIG. 26 is a schematic diagram depicting aspects of an example user interface in accordance with at least one embodiment.
Figure 27:
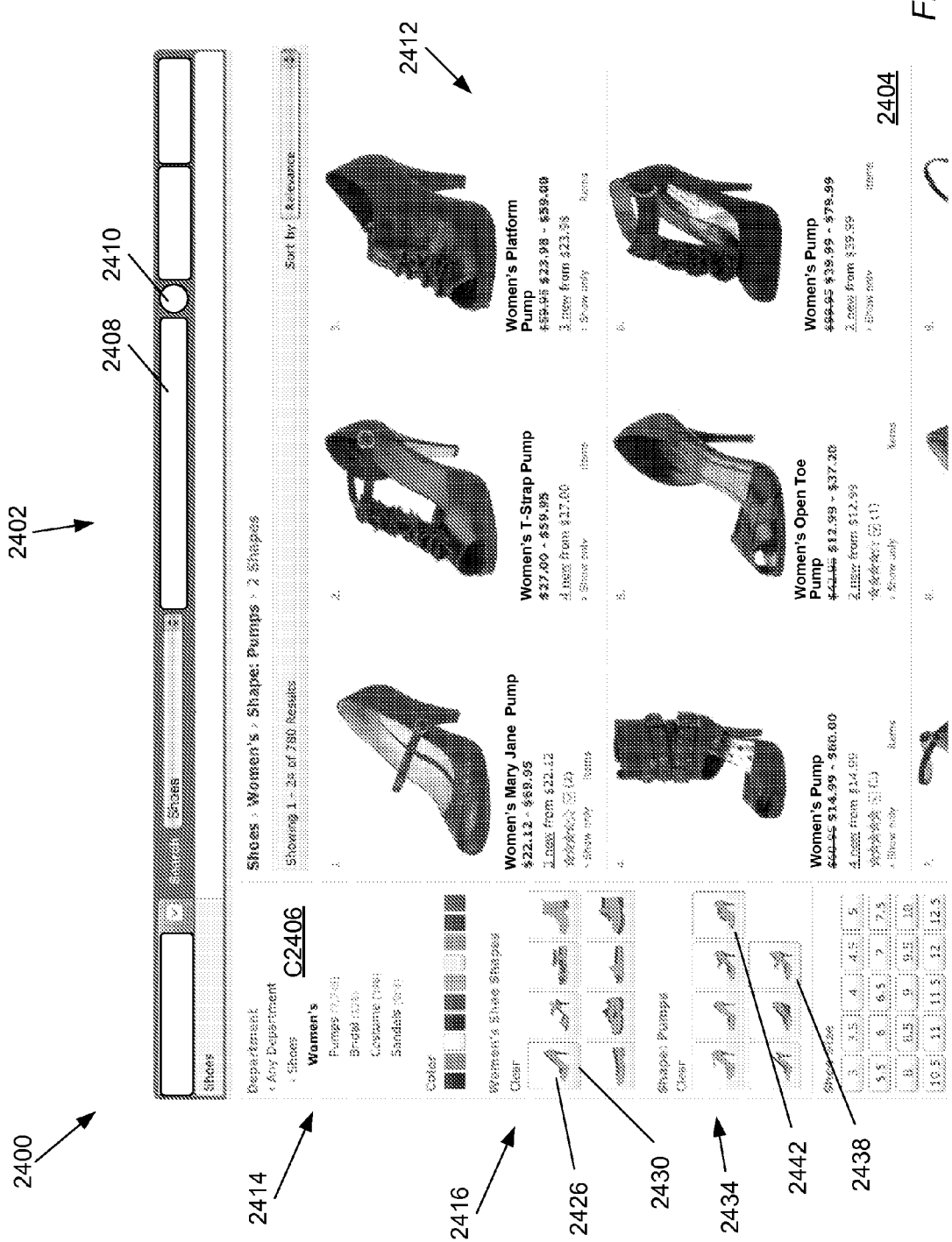
FIG. 27 is a schematic diagram depicting aspects of an example user interface in accordance with at least one embodiment.

As illustrated in FIG. 26, when a user selects one of the child refinement shapes represented by the icons at 2434, then the results presented in the search result presentation 2412 are further restricted to items having shapes similar to the selected child refinement shape. For example, when a user selects icon 2438, which represents a t-shaped strap refinement shape, the results presented in the search result presentation 2412 are restricted to women's high heeled pumps having a t-shaped strap shape. Further, as illustrated in FIG. 27, the user may select more than one of the child refinement shapes represented by the icons at 2434. When multiple icons are selected, the results presented in the search result presentation 2412 are limited to items having shapes similar to the multiple child refinement shapes that corresponded to the selected icons. For example, when a user selects icon 2438, which represents the t-shaped strap refinement shape, and icon 2442, which represents a feminine bootie refinement shape, the results presented in the search result presentation 2412 are restricted to women's high heel pumps having a t-strap shape and women's high heel pumps having a feminine bootie shape.

The description now turns to example steps that may be performed in accordance with at least one embodiment. For example, the example steps discussed below with reference to FIGS. 28 and 29 may be executed by system 2200 of FIG. 22, which may be implemented in system 200 of FIG. 2. Further, for purposes of the discussion below with reference to FIGS. 28 and 29, it should be appreciated that inventory items 2208 may be categorized into at least one of the item category hierarchies 2212 and that associated images 2210 may be considered as given and/or pre-established. Also, for purposes of the discussion below with reference to FIGS. 28 and 29, it should be appreciated that one or more of the refinement shape hierarchies 2214 and refinement shape maps 2216 may be pre-established, however, each embodiment need not be so limited.

Figure 28:
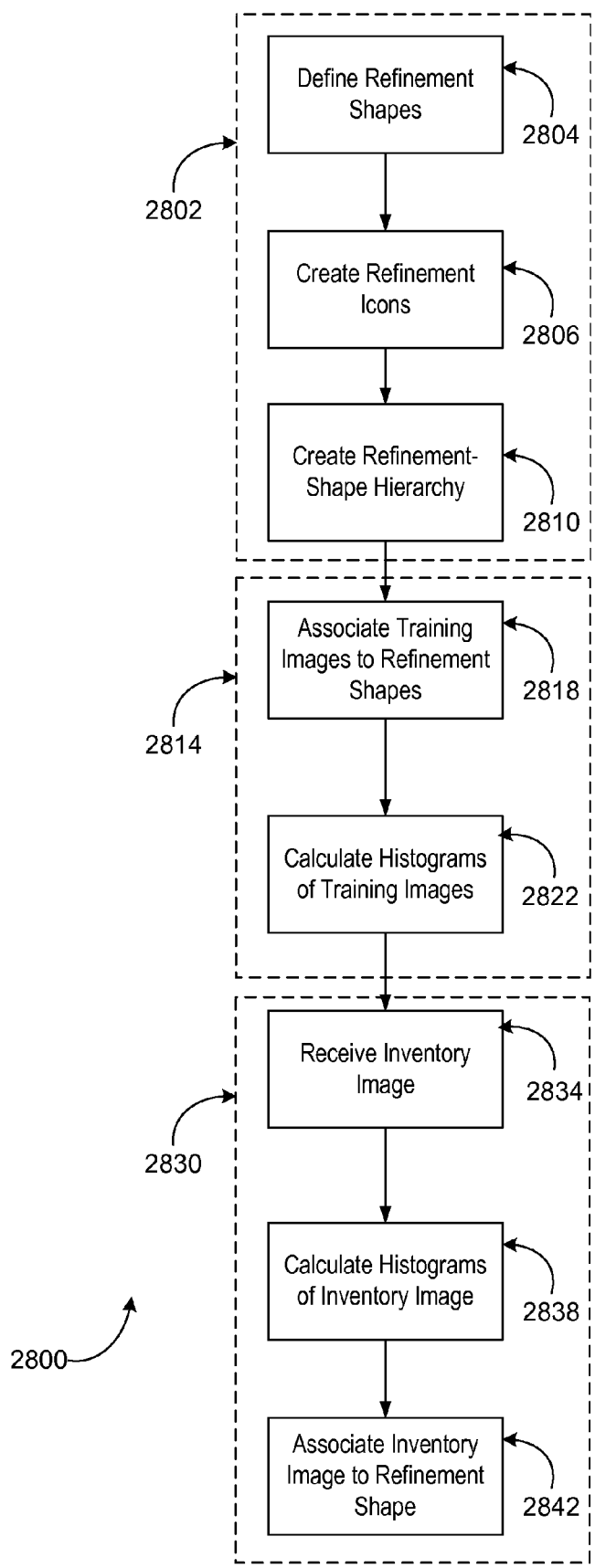
FIG. 28 is a flowchart depicting example steps for processing images in accordance with at least one embodiment.
Figure 29:
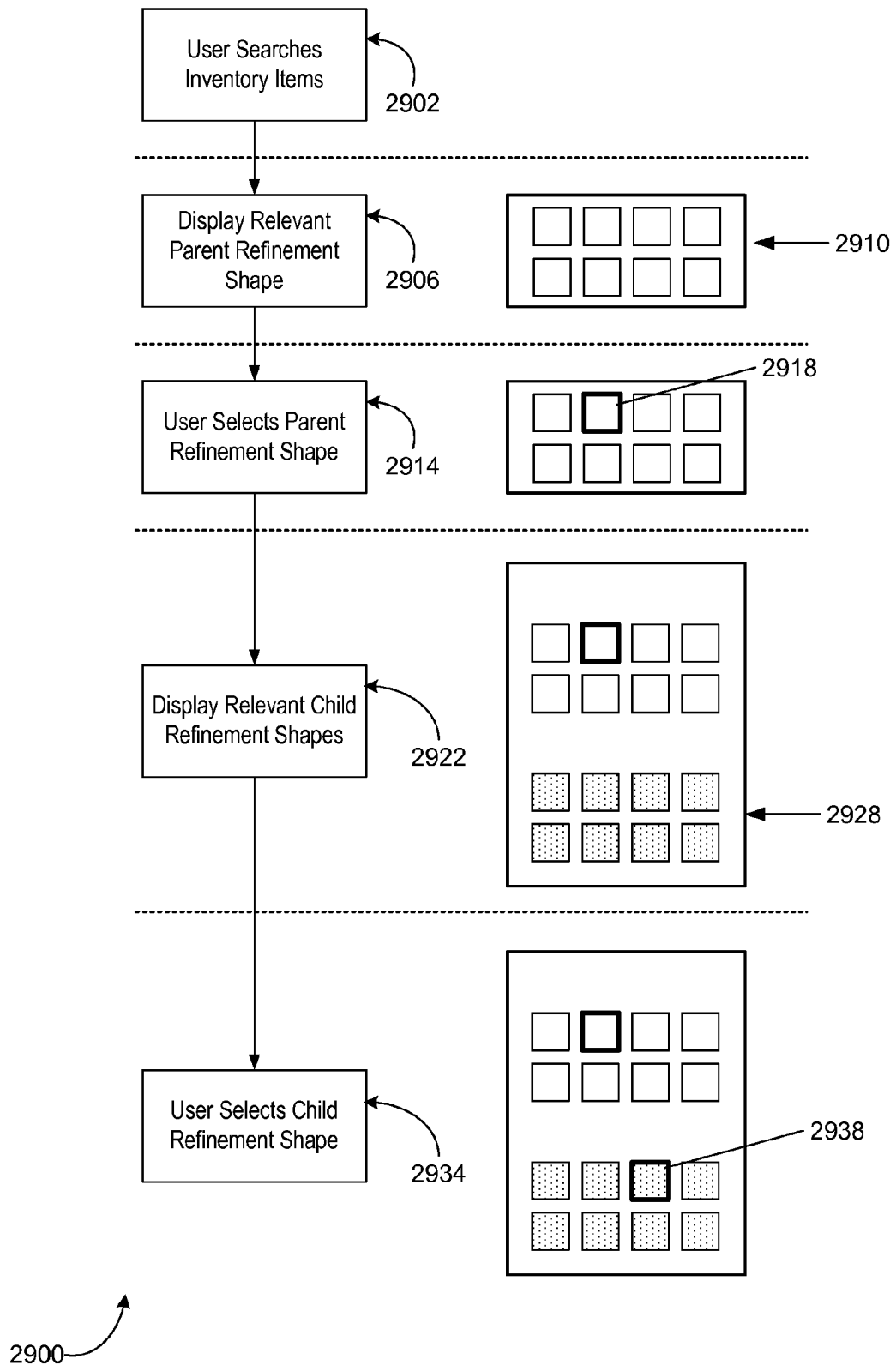
FIG. 29 is a schematic diagram depicting example steps for searching a refinement-shape hierarchy in accordance with at least one embodiment.

FIG. 28 depicts an example process 2800 for defining refinement shapes, organizing the refinement shapes into a refinement-shape hierarchy, and associating inventory items to refinement shapes of the refinement shape hierarchy in accordance with at least one embodiment. As indicated at box 2802, the process 2800 generally begins with creating a refinement shape hierarchy. However, as mentioned above, it should be appreciated that the refinement shape hierarchy may be pre-established. In such cases, the steps in box 2802 may be omitted.

To create a refinement shape hierarchy, the process 2800 at step 2804 generally begins by defining refinement shapes, which eventually become part of the refinement shape hierarchy. According to some embodiments, refinement shapes are manually defined and generally represent the shapes of types or categories of inventory items 2208. For example, if the inventory item 2208 is a women's dress boot, then a corresponding refinement shape may generally represent a generic shape of a women's dress boot. The items 2208 are divided into categories or types of shapes and a refinement shape is provided for each of the categories or types. According to other embodiments, refinement shapes are automatically created by the refinement shape generation module 2224. For example, the refinement shape generation module 2224 may aggregate the histograms for the images 2210 of the collection of items 2208 and cluster the aggregate at various granularities. The refinement shape generation module 2224 then selects shapes from cluster centers as representative of shapes in the clusters. These selected shapes are designated as being the refinement shapes.

Next, as indicated at step 2806, refinement icons are created for the refinements shapes created according to step 2804. The refinement icons provide a schematic illustration of the refinement shapes created at step 2804 and may be presented to a user via a user interface. For example, the refinement icons may be refinement icons 2418 and 2420, which are displayed to a user via the refinement shape hierarchy presentation 2416 of the user interface 2400 illustrated in FIGS. 24-27. Next, as indicated at step 2810, a refinement shape hierarchy 2214 is created by arranging the refinement shapes into a plurality of levels. According to some embodiments, refinement shape hierarchies 2214 are created based on the pre-established item category hierarchies 2212. According to other embodiments, the refinement shape generation module 2224 may facilitate automated refinement shape hierarchy generation at least in part by utilizing histograms of images 2210 of items 2208 generated by the histogram module 2218 and/or the histogram module 2218 of FIG. 2 in accordance with the processes described above with reference to FIGS. 4-13. For example, the refinement shape generation module 2224 may define the levels of a refinement shape hierarchy such that the levels correspond to the aggregate clusterings, which were previously created by the refinement shape generation module 2224 according to step 2804. Connections between levels of the refinement hierarchy may correspond to overlaps by clusters from aggregate clusterings of different granularity. Cluster granularity may be varied between levels of the refinement shape hierarchy so that refinement shapes in the refinement shape hierarchy have less than a threshold number of child refinement shapes. According to some embodiments, after the steps of box 2802 have been completed, the refinement shape hierarchy has been created.

Once the refinement shape hierarchy has been created, histogram descriptors of training items and associated images 2220 may be used to approximate the bounds of the descriptor space for the various refinement shapes of the refinement shape hierarchy 2214, as indicated by the steps of box 2814. For example, as indicated at step 2818, training images of training items are associated with the refinement shapes of the refinement shape hierarchy. According to some embodiments, the step of 2818 involves manually associating ones of a plurality of training images of training items to at least one of the refinement shapes based at least in part on similarities between the refinement shapes and shapes of the training items. Next, according to step 2822, histogram descriptors are calculated for the training images. For example, for the refinement shape hierarchy 2300 of FIG. 23, a training set of images of shoes may be manually assigned to each of the refinement shapes 2306, 2310, 2314, 2318, 2322, 2326, 2330, 2334, and 2340. Then, histogram descriptors are calculated for each of the training images. It should be appreciated that the calculated histogram descriptors, which are associated with the various refinement shapes 2306, 2310, 2314, 2318, 2322, 2326, 2330, 2334, and 2340 may be used to determine the descriptor space around each of the refinement shapes.

After the training images have been used to approximate the descriptor space for the refinement shapes of the refinement shape hierarchy, the images 2210 of the items 2208 may be assigned, mapped, or otherwise associated with the refinement shapes of the refinement shape hierarchy, as indicated at box 2830. For example, according to an embodiment, the refinement shape mapping module 2222 creates and/or updates refinement shape maps 2216, which map the images 2210 of the items 2208 to the nearest refinement shapes of the refinement shape hierarchies according to the steps indicated in block 2830. According to step 2834, an image 2210 of an inventory item 2208 is received. It should be appreciated that any number of images 2210 may be received at step 2834. For example, if images of items of an inventory are all being mapped as part of a pre-processing build phase, then thousands of images may be received. However, if new images are being added to already existing refinement shape hierarchies, then a single image may be received at step 2834. After the images are received, histogram descriptors are calculated for each of the images 2210 according to step 2838. The histograms calculated at step 2838 may be the local-texture, local-shape, global-shape, and contour histograms described above with references to FIGS. 4-13, for example. In this case, the histogram module 2218 may calculate the histograms according to the processes previously described with reference to FIGS. 4-13. It should be appreciated, however, that any number and type of histogram descriptor may be calculated for the images.

Then, as indicated at step 2842, after the histograms are calculated, the image or images received at step 2834 are mapped to the nearest one or more of the refinement shapes of the refinement shape hierarchies 2214. For example, step 2842 may involve associating the images 2210 of the inventory items 2208 to the refinement shapes of the refinement shape hierarchies 2214 based at least in part on similarities between the histograms of the images 2210 of the inventory items 2208 and the histograms of the training images 2220 that are associated with the refinement shapes. According to some embodiments, images 2210 are assigned based on similarities between histograms of the images 2210 and histograms the training images 2220, where these similarities between the histograms are determined by calculating the distances between the respective histograms. These distances, for example, may be determined using dot product comparisons. It should be appreciated that each of the histograms of the training images and each of the histograms of the images of the inventory items are combined histograms based at least in part on a local-texture histogram, a global-shape histogram, a local-shape histogram, and a contour histogram. For example, the combined histograms may be a combination of any two or more of the local-texture histograms, the local-shape histograms, the global-shape histograms, and the contour histograms of the respective images.

According to some embodiments, associating one of the images 2210 of the inventory items 2208 to one the refinement shapes of one of the refinement shape hierarchies involves calculating a similarity score between the image 2210 of the inventory items 2208, identifying at least one of the similarity scores that is above a threshold, identifying at least one of the training images 2220 that is associated with the identified at least one of the similarity scores, identifying at least one of the refinement shapes that is associated with the identified at least one of the training images 2220, and then associating the image 2210 of the inventory items 2208 with the identified at least one of the refinement shapes of one of the refinement shape hierarchies.

After the images have been processed in accordance with the process 2800 for, among other things, defining refinement shapes, organizing the refinement shapes into refinement-shape hierarchies, and associating inventory items to refinement shapes of the refinement-shape hierarchies, visual-based searching may be preformed. The discussion now turns to example process 2900 of FIG. 29 that may be performed by system 2200 of FIG. 22, which may be implemented in system 200 of FIG. 2, to enable visual-based searching of refinement-shape hierarchies 2214 to identify inventory items 2208 having shapes similar to query refinement shapes in accordance with at least one embodiment.

At step 2902, a search request may be received. For example, the client device 102 (FIG. 1) may submit the search request responsive to the user interface 2400 (FIG. 24), and the search request may be received by the search module 2206 (FIG. 22). At step 2906, relevant parent refinement shapes are displayed. Here, for example, exemplary icons 2910 that represent the relevant parent shapes are display. For example, if the search request is a text search for "women's shoes" that is entered in the input text component 2408 of the user interface 2400, then according to step 2906, the search module 2206 returns parent shapes for women's shoes. The parent shapes 2306, 2310, 2314, 2318, 2322, 2326, 2330, and 2334 of refinement shape hierarchy 300 may be presented to the user via the refinement shape hierarchy presentation 2416 of the user interface 2400.

Next, at step 2914, the user selects the icon associated with the refinement shape that the user wants to use to restrict the search results. Step 2914 is schematically illustrated at 2918, which shows the selected icon as being visually emphasized with a distinctive attention indicator. As mentioned above with reference to FIG. 24, icons may be emphasized based at least in part on a user selecting the icon to refine the search result set that is at least partially presented by the search result component 2404. At step 2922, the search module 2206 displays relevant child refinement shapes. For example, exemplary icons 2928 are representative of the child refinement shapes. Also for example, when executing step 2922, the search module 2206 of FIG. 22 displays the icons that represent the child refinement shapes of the selected parent refinement shape. As indicated at 2434 of FIG. 2400, if a user selects icon 2426, which represents the parent refinement shape for women's high heeled pumps, then the refinement shape hierarchy presentation 2416 presents icons that represent the child refinement shapes 2434 for women's high heeled pumps. According to this example, the icons presented at 2434 (FIG. 25) correspond to the refinement shapes 2340 (FIG. 23), which reside at a second level of the refinement shape hierarchy 2300 (FIG. 23) and are child shapes for women's high heeled pumps 2334.

At step 2934, the user selects the child refinement shape that the user wants to use to restrict the search results. For example, the user selects an icon associated with the child refinement shape that the user wants to use to restrict the search results. Step 2934 is schematically illustrated at 2938, which shows the selected icon as being visually emphasized with a distinctive attention indicator. After the user selects the child refinement shape, the search module 2206 restricts the search results displayed in the refinement shape hierarchy presentation 2416 to items having the selected child refinement shape.

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein. All the incorporated materials other than those of published US applications and/or US patents are not essential materials.

What is claimed is:

1. A computer-implemented method comprising:
   under the control of one or more computer systems configured with executable instructions,
   defining a plurality of refinement shapes;
   associating ones of a plurality of training images of training items to at least one of the refinement shapes based at least in part on similarities between the refinement shapes and shapes of the training items;
   calculating a first plurality of local histogram descriptors of the training images;
   receiving images of a plurality of inventory items;
   calculating a second plurality of local histogram descriptors of the images of the inventory items;
   associating the images of the inventory items to the refinement shapes based at least in part on similarities between the second plurality of local histogram descriptors of the images of the inventory items and the first plurality of local histogram descriptors of the training images that are associated with the refinement shapes; and
   responsive to receiving information for a search request specifying at least one of the refinement shapes, providing search results including at least a reference to at least one of the images of the inventory items associated with the specified at least one of the refinement shapes.

2. The computer-implemented method of claim 1, wherein the refinement shapes are arranged in a refinement-shape hierarchy having a parent level and a child level.

3. The computer-implemented method of claim 1, wherein the similarities between the descriptors of the images of the inventory items and the descriptors of the training images are determined by calculating the similarity between the respective descriptors.

4. The computer-implemented method of claim 3, wherein each of the descriptors of the training images and each of the descriptors of the images of the inventory items are combined descriptors based at least in part on a local-texture descriptor, a global-shape descriptor, a local-shape descriptor, and a contour descriptor.

5. The computer-implemented method of claim 1, wherein associating the images of the inventory items to the refinement shapes comprises:
   for each of the images of the inventory items,
      based at least in part on similarity between a first plurality of local histogram descriptors associated with the images of the inventory items and a second plurality of local histogram descriptors associated with the training images, calculating a similarity score between the image of the inventory items and each of the training images;
      identifying at least one of the similarity scores that is above a threshold;
      identifying at least one of the training images that is associated with the identified at least one of the similarity scores;
      identifying at least one of the refinement shapes that is associated with the identified at least one of the training images; and
      associating the image of the inventory items with the identified at least one of the refinement shapes.

6. The computer-implemented method of claim 1, wherein the refinement shapes correspond to common shapes of the inventory items.

7. The computer-implemented method of claim 1, wherein the inventory items are shoes and the refinement shapes correspond to common shapes of shoes.

8. The computer-implemented method of claim 1, wherein the refinement shapes are manually selected.

9. A computer-implemented method comprising:
   under the control of one or more computer systems configured with executable instructions,
   obtaining a plurality of refinement shapes;
   associating ones of a plurality of images of inventory items to at least one of the refinement shapes based at least in part on similarity between a first plurality of local histogram descriptors associated with the refinement shapes and a second plurality of local histogram descriptors associated with the inventory items; and
   responsive to receiving information for a search request specifying at least one of the refinement shapes, providing search results including at least a reference to at least one of the images of the inventory items associated with the at least one of the refinement shapes specified in the search request.

10. The computer-implemented method of claim 9, further comprising:
    creating a refinement-shape hierarchy by arranging the refinement shapes in a plurality of levels.

11. The computer-implemented method of claim 10, wherein the levels of the refinement-shape hierarchy include a parent level and a child level.

12. The computer-implemented method of claim 9, further comprising:
    associating ones of a plurality of training images of training items to at least one of the refinement shapes based at least in part on similarities between the refinement shapes and shapes of the training items.

13. The computer-implemented method of claim 12, further comprising:
    calculating descriptors of the training images; and calculating descriptors of the images of the inventory items.

14. The computer-implemented method of claim 13, wherein the similarities between the refinement shapes and shapes of the inventory items are based at least in part on similarities between the descriptors of the images of the inventory items and the descriptors of the training images that are associated with the refinement shapes.

15. A computer-implemented method comprising:
under the control of one or more computer systems configured with executable instructions,
associating ones of a plurality of training images of training items to at least one of a plurality of refinement shapes based at least in part on similarities between the refinement shapes and shapes of the training items;
calculating a first plurality of local histogram descriptors of the training images;
receiving an image of an inventory item;
calculating at least one second local histogram descriptor of the image of the inventory item; and
associating the image of the inventory item to at least one of the plurality of refinement shapes based at least in part on similarities between the at least one second local histogram descriptor of the image of the inventory item and the first plurality of local histogram descriptors of the training images that are associated with the refinement shapes.

16. The computer-implemented method of claim 15, further comprising:
responsive to receiving information for a search request specifying the at least one of the refinement shapes associated with the image of the inventory item, providing at least a reference to the image of the inventory item.

17. The computer-implemented method of claim 15, wherein associating the image of the inventory item to the at least one refinement shape comprises:
calculating a similarity score between the image of the inventory item and each of the training images;
identifying at least one of the similarity scores that is above a threshold;
identifying at least one of the training images that is associated with the identified at least one of the similarity scores;
identifying at least one of the refinement shapes that is associated with the identified at least one of the training images; and
associating the image of the inventory item with the identified at least one of the refinement shapes.

18. A computer program product embedded in a non-transitory computer-readable medium, comprising:
program code for receiving a plurality of refinement shapes;
program code for associating ones of a plurality of images of inventory items to at least one of the refinement shapes based at least in part on similarities between a first plurality of local histogram descriptors associated with the refinement shapes and a second plurality of local histogram descriptors associated with shapes of the inventory items; and
program code for responsive to receiving information for a search request specifying at least one of the refinement shapes, providing search results including at least a reference to at least one of the images of the inventory items associated with the at least one of the refinement shapes specified in the search request.

19. The computer program product of claim 18, further comprising:
program code for creating a refinement-shape hierarchy by arranging the refinement shapes in a plurality of levels.

20. The computer program product of claim 18, further comprising:
program code for associating ones of a plurality of training images of training items to at least one of the refinement shapes based at least in part on similarities between the refinement shapes and shapes of the training items.

21. The computer program product of claim 20, further comprising:
program code for calculating descriptors of the training images; and
program code for calculating descriptors of the images of the inventory items.

22. A system comprising:
a processor; and
a memory device including instruction that, when executed by the processor, cause the processor to:
receive a plurality of refinement shapes;
associate ones of a plurality of images of inventory items to at least one of the refinement shapes based at least in part on similarities between a first plurality of local histogram descriptors associated with the refinement shapes and a second plurality of local histogram descriptors associated with shapes of the inventory items; and
responsive to receiving information for a search request specifying at least one of the refinement shapes, provide search results including at least a reference to at least one of the images of the inventory items associated with the at least one of the refinement shapes specified in the search request.

23. The system of claim 22, wherein the memory device further includes instructions that, when executed by the processor, cause the processor to:
program code for associating ones of a plurality of training images of training items to at least one of the refinement shapes based at least in part on similarities between the refinement shapes and shapes of the training items.

24. The system of claim 23, wherein the memory device further includes instructions that, when executed by the processor, cause the processor to:
program code for calculating descriptors of the training images; and
program code for calculating descriptors of the images of the inventory items.

* * * * *